US012705076B1

(12) United States Patent
Turner

(10) Patent No.: US 12,705,076 B1

(45) Date of Patent: Aug. 11, 2026

(54) APPARATUS FOR AND METHOD OF DISPLAYING A MODIFIED USER INTERFACE ELEMENT

(71) Applicant: EmergIP, LLC, Dover, DE (US)

(72) Inventor: Christopher Turner, Dover, DE (US)

(73) Assignee: EmergIP, LLC, Dover, DE (US)

( * ) Notice: Subject to any disclaimer, the term of this patent is extended or adjusted under 35 U.S.C. 154(b) by 0 days.

(21) Appl. No.: 19/397,222

(22) Filed: Nov. 21, 2025

(51) Int. Cl.

| | |
|---|---|
| ***G06F 9/451*** | (2018.01) |
| ***G06F 3/0482*** | (2013.01) |
| ***G06F 40/205*** | (2020.01) |
| ***G06T 13/80*** | (2011.01) |

(52) U.S. Cl.
CPC ............ *G06F 9/451* (2018.02); *G06F 3/0482* (2013.01); *G06F 40/205* (2020.01); *G06T 13/80* (2013.01)

(58) Field of Classification Search
CPC ........................................................ G06F 9/451
USPC ......................................................... 715/764
See application file for complete search history.

(56) References Cited

U.S. PATENT DOCUMENTS 7,457,853 B1 * 11/2008 Chari .................... H04L 67/125 709/219
7,523,231 B1 * 4/2009 Gupta .................. G06F 3/0683 710/36
7,680,901 B2 * 3/2010 Rechterman ......... G06Q 10/107 709/219
10,332,194 B2 * 6/2019 Chong .................. G06F 9/4451
11,354,604 B2 * 6/2022 Zellner .................. A61B 5/121
11,694,119 B1 * 7/2023 Snyder .................. G06F 16/838 706/11
11,720,555 B1 * 8/2023 Snyder .............. G06Q 30/0201 707/609
11,805,032 B2 * 10/2023 Madafferi ............. G06Q 20/20
11,847,473 B1 * 12/2023 Lin ......................... G06F 18/24
12,505,137 B1 * 12/2025 Liu ..................... G06F 16/3344
2006/0031757 A9 * 2/2006 Vincent .............. G06F 3/04812 715/275

(Continued)

FOREIGN PATENT DOCUMENTS

WO 2019085064 A1 5/2019

OTHER PUBLICATIONS

B H Kim Deep Claim: Payer Response Prediction from Claims Data with Deep Learning "arXiv:2007.06229 Submitted on Jul. 13, 2020".

*Primary Examiner* — Reza Nabi
(74) *Attorney, Agent, or Firm* — Caldwell LLC

(57) ABSTRACT

An apparatus and method for displaying a modified user interface element. The apparatus includes at least a processor and a memory communicatively connected to the at least a processor. The memory instructs the processor to receive batch data of subject data associated with a subject profile of a plurality of subject profiles, generate a prediction associated with the batch data, generate a user interface element as a function of the prediction and the batch data, and display, using a first client device, the user interface element. The memory instructs the processor to receive feedback data from the first client device, generate a modified user interface element as a function of the prediction and the feedback data, and display, using a second client device, the modified user interface element. The batch data is associated with event data and the feedback data is associated with the user interface element.

16 Claims, 10 Drawing Sheets

(56) References Cited

U.S. PATENT DOCUMENTS

| | | | | |
|---|---|---|---|---|
| 2008/0109276 | A1* | 5/2008 | Ionfrida | G06F 8/20 717/104 |
| 2011/0118557 | A1* | 5/2011 | McKenna | A61B 5/7475 600/300 |
| 2017/0236212 | A1* | 8/2017 | Purville | G06Q 40/12 705/30 |
| 2017/0236214 | A1* | 8/2017 | Wang | G06Q 40/12 705/30 |
| 2017/0308652 | A1 | 10/2017 | Ligon | |
| 2018/0314980 | A1* | 11/2018 | Osotio | G06N 20/00 |
| 2019/0087398 | A1* | 3/2019 | Kolesov | G06F 40/174 |
| 2020/0151259 | A1* | 5/2020 | Smith | G06N 3/045 |
| 2021/0343406 | A1* | 11/2021 | McMillan | G06N 20/00 |
| 2022/0012072 | A1* | 1/2022 | Barnett | G06F 16/9577 |
| 2022/0244818 | A1* | 8/2022 | Strecher | G06T 11/00 |
| 2022/0319678 | A1 | 10/2022 | Harada et al. | |
| 2023/0214455 | A1 | 7/2023 | Menard et al. | |
| 2023/0244368 | A1* | 8/2023 | Sil | G06V 20/50 |
| 2023/0351706 | A1* | 11/2023 | Babinowich | G06T 7/579 |
| 2024/0118788 | A1* | 4/2024 | Hunter | H04N 21/4821 |
| 2024/0169195 | A1* | 5/2024 | Tao | H04L 63/1425 |
| 2024/0330602 | A1* | 10/2024 | Lamba | G06F 40/47 |
| 2025/0008306 | A1* | 1/2025 | Allsbrook | G16Y 40/10 |
| 2025/0150494 | A1* | 5/2025 | Piira | G06N 20/00 |
| 2025/0232500 | A1* | 7/2025 | Basher | G06F 40/40 |
| 2025/0265460 | A1* | 8/2025 | Kanwar | G06N 3/045 |
| 2025/0349070 | A1* | 11/2025 | Keetle-Maloney | G06F 3/017 |
| 2025/0387716 | A1* | 12/2025 | Herigstad | A63F 13/822 |
| 2025/0390517 | A1* | 12/2025 | Wu | G06F 16/3329 |
| 2026/0019455 | A1* | 1/2026 | Danielpour | H04L 65/40 |

* cited by examiner

APPARATUS FOR AND METHOD OF DISPLAYING A MODIFIED USER INTERFACE ELEMENT

FIELD OF THE INVENTION

The present invention generally relates to the field of artificial intelligence. In particular, the present invention is directed to an apparatus for and a method of displaying a modified user interface element.

BACKGROUND

In many existing systems, graphical user interfaces used for managing subject-related data remain static and require extensive manual input, resulting in inefficiencies and inconsistent data accuracy across different users and devices. Traditional interfaces are not configured to adapt dynamically based on predictive analysis or contextual feedback associated with a subject profile, limiting their ability to guide data entry or modify displayed elements intelligently. Additionally, conventional systems often fail to generate flexible or context-aware visual structures capable of evolving in response to changing subject data, prediction results, or user interactions, thereby restricting the adaptability and responsiveness of the overall interface experience.

SUMMARY OF THE DISCLOSURE

In an aspect, an apparatus for displaying a modified user interface element includes at least a processor and a memory communicatively connected to the at least a processor. The memory contains instructions configuring the processor to receive batch data of subject data associated with a subject profile of a plurality of subject profiles, wherein the batch data is associated with event data, generate a prediction associated with the batch data, generate a user interface element as a function of the prediction and the batch data, display, using a first client device, the user interface element, receive feedback data from the first client device, wherein the feedback data is associated with the user interface element, generate a modified user interface element as a function of the prediction and the feedback data, and display, using a second client device, the modified user interface element.

In another aspect, a method of displaying a modified user interface element includes receiving, using at least a processor, batch data of subject data associated with a subject profile of a plurality of subject profiles, wherein the batch data is associated with event data, generating, using the at least a processor, a prediction associated with the batch data, generating, using the at least a processor, a user interface element as a function of the prediction and the batch data, displaying, using a first client device, the user interface element, receiving, using the at least a processor, feedback data from the first client device, wherein the feedback data is associated with the user interface element, generating, using the at least a processor, a modified user interface element as a function of the prediction and the feedback data, and displaying, using a second client device, the modified user interface element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for displaying a modified user interface element. The apparatus includes at least a computing device comprised of a processor and a memory communicatively connected to the processor. The memory instructs the processor to receive batch data of subject data associated with a subject profile of a plurality of subject profiles, wherein the batch data is associated with event data. The processor generates a prediction associated with the batch data. The processor generates a user interface element as a function of the prediction and the batch data. Additionally, the processor displays, using a first client device, the user interface element. The processor receives feedback data from the first client device, wherein the feedback data is associated with the user interface element. The memory then instructs the processor to generate a modified user interface element as a function of the prediction and the feedback data. The processor displays, using a second client device, the modified user interface element.

Exemplary embodiments illustrating aspects of the present disclosure are described below in the context of several specific examples.

Figure 1:
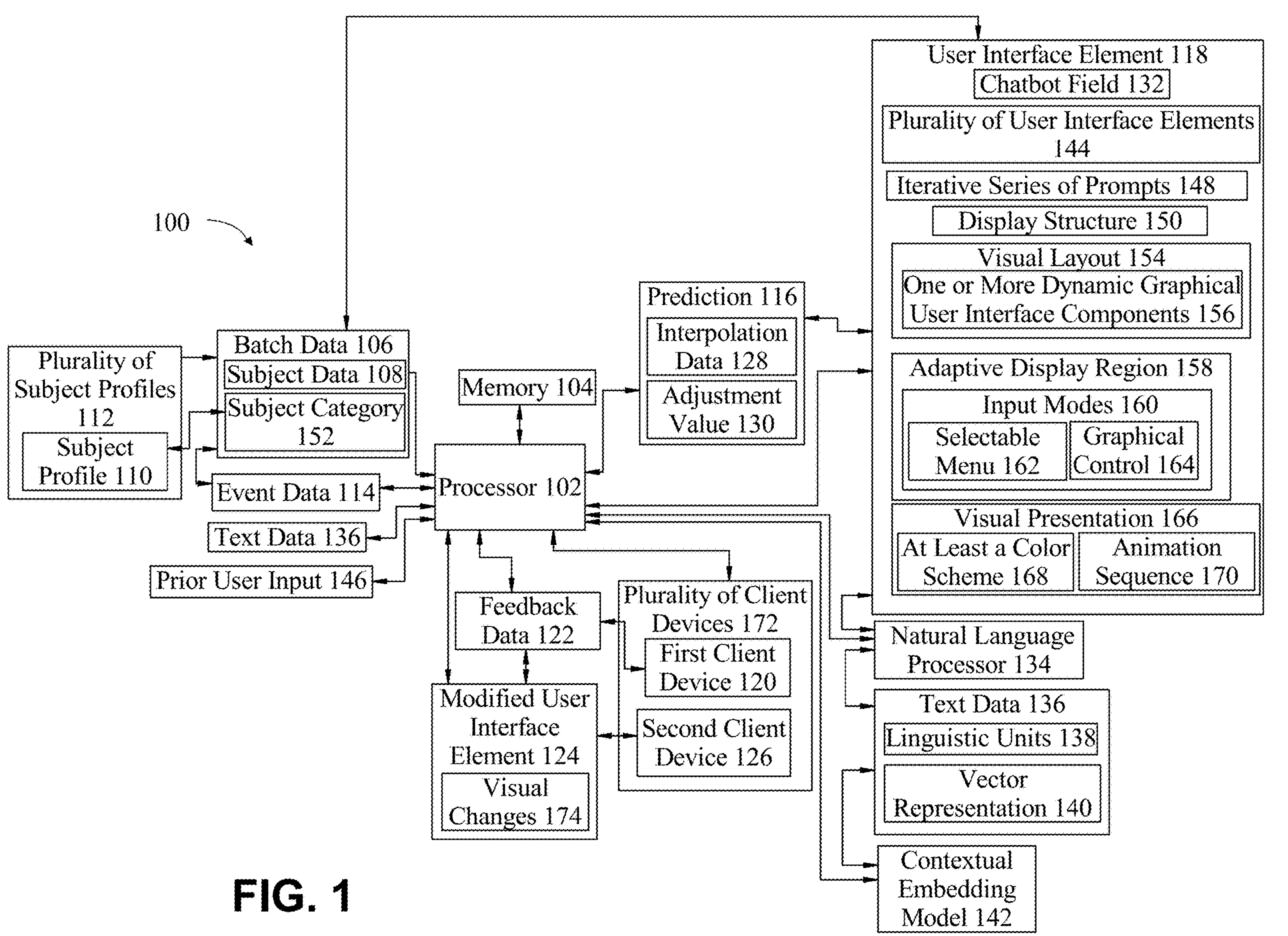
FIG. 1 is a block diagram of an apparatus for displaying a modified user interface element.

Referring now to FIG. 1, the apparatus 100 includes may include a data or enterprise layer configured to clean and validate patient-related information to ensure accuracy before presenting it to a user interface layer. The apparatus 100 may be configured to collect demographic and payment-related information from patients and to generate predictive outputs, such as a probability of payment, which may inform how data is displayed or requested from the user. The apparatus 100 may further be configured to generate payment plan options and to communicate these through chatbots or other interactive user interface elements, thereby facilitating efficient and adaptive patient interaction. The apparatus 100 may emphasize technical improvements in how user interfaces dynamically adapt based on predictive analytics. For example, the apparatus 100 may make a prediction about available or missing data and, in response, modify a graphical user interface to generate a new input field, either visual or chatbot-based, to collect additional information. This operation may occur iteratively, allowing the user interface to flexibly adjust to patient responses and data conditions. The apparatus 100 may display modified or updated user interfaces across multiple devices, such that interaction on one device, such as a patient's mobile portal, dynamically modifies what is shown on another device, such as an administrator terminal. Without limitation, the apparatus 100 may enable flexible, prediction-driven data entry and patient communication within a healthcare billing or account management environment.

With continued reference to FIG. 1, an exemplary embodiment of apparatus 100 for displaying a modified user interface element is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive batch data 106 of subject data 108 associated with a subject profile 110 of a plurality of subject profiles 112, wherein the batch data 106 is associated with event data 114. As used in this disclosure, "batch data" is a collection of subject data 108 records received and processed together, each record corresponding to one or more patient accounts within a plurality of subject profiles 112. In a non-limiting example, the batch data 106 may include a plurality of patient account records imported from a hospital billing system. In an embodiment, the batch data 106 may include information such as patient identifiers, insurance details, and payment histories for a group of patients collected over a specific time interval. Without limitation, the batch data 106 may be processed by the apparatus 100 to generate predictions related to billing outcomes or to update user interface displays for multiple patients simultaneously. As used in this disclosure, "subject data" is information associated with an individual patient, including demographic, insurance, or payment-related information. In a non-limiting example, the subject data 108 may include a patient's name, address, date of birth, insurance provider, account balance, and prior payment activity. In an embodiment, the subject data 108 may also include communication preferences or previously submitted form responses received through a patient-facing user interface. For example, without limitation, the subject data 108 may be analyzed by the apparatus 100 to determine which information fields are incomplete and to generate corresponding user interface elements to request additional details. As used in this disclosure, a "subject profile" is a digital record representing a particular patient, the record including one or more instances of subject data 108 and historical interaction information associated with that patient. In a non-limiting example, the subject profile 110 may comprise a comprehensive digital record maintained by a healthcare billing platform to store and manage information related to an individual patient's financial and demographic attributes. In an embodiment, the subject profile 110 may further include predictive analytics data such as a payment probability score or a communication history log. Without limitation, the apparatus 100 may reference the subject profile 110 to determine what type of user interface element 118 to display to the patient or to a system administrator. As used in this disclosure, "event data" is information describing one or more transactions, communications, or interactions between a patient and a healthcare or billing entity. In a non-limiting example, the event data 114 may include information such as invoice generation, payment submission, insurance claim processing, or message exchanges between a patient and a billing office. In an embodiment, the event data 114 may also include timestamps, payment methods, or confirmation details associated with a billing event. For example, without limitation, the event data 114 may be used by the apparatus 100 to correlate patient interactions with billing outcomes and to predict the likelihood of future payments or data updates.

With continued reference to FIG. 1, in a non-limiting example, processor 102 may receive the batch data 106, subject data 108, subject profiles 112, event data 114, and the like from a variety of sources within a healthcare or billing infrastructure, each source contributing specific types of information relevant to patient account management. As used in this disclosure, a "healthcare or billing infrastructure" is a networked computing environment that includes one or more systems, databases, or communication interfaces configured to manage patient, billing, and insurance data. In a non-limiting example, the healthcare or billing infrastructure may include electronic health record systems, billing management platforms, claim processing servers, and patient-facing web or mobile applications. The processor 102 may receive batch data 106 through a secure data interface from an enterprise billing database or a hospital information management system. As used in this disclosure, a "hospital information management system" is a computing system configured to collect, maintain, and share clinical and administrative data within a healthcare organization. In a non-limiting example, the hospital information management system may transmit patient demographic and insurance information to the processor 102 for integration into the apparatus 100. Without limitation, batch data 106 may be transmitted at scheduled intervals, such as nightly synchronization events or upon completion of a billing cycle, to ensure that multiple patient accounts are updated and processed collectively. The received batch data 106 may include demographic entries, insurance information, and financial transaction summaries compiled for a plurality of patients managed by a healthcare provider or billing administrator. In an embodiment, the processor 102 may receive subject data 108 directly from patient-facing applications or portals through which patients enter or update their personal, insurance, or payment information. As used in this disclosure, a "patient-facing application" is a software interface accessible by a patient through a computing device such as a mobile phone, tablet, or computer, the interface being configured to allow the patient to view, verify, or update personal, insurance, or payment-related data. For example, without limitation, a patient using a mobile billing application may provide new insurance details or updated contact information through a chatbot or graphical input field, and that information may be transmitted over a secure network connection to the processor 102 in real time. The processor 102 may receive subject data 108 from administrative users, such as billing specialists or customer service representatives, who manually input corrections or verification results through an internal management interface. As used in this disclosure, an "administrative user" is a human operator affiliated with a healthcare or billing entity who interacts with the apparatus 100 to review, verify, or modify patient account information. In a non-limiting example, the administrative user may be a billing specialist, a claims processor, or a customer service representative. In a non-limiting example, subject profiles 112 may be received or retrieved by the processor 102 from a centralized patient account repository. As used in this disclosure, a "centralized patient account repository" is a structured data storage system configured to maintain digital patient records accessible to multiple client devices 172 and applications. In a non-limiting example, the centralized patient account repository may include a secure relational database that stores subject profiles 112, subject data 108, and corresponding event data 114. The processor 102 may access these profiles when a new batch processing event is triggered, or when a specific patient record is requested for review or update. Each subject profile 110 may be transmitted as a structured data object containing unique identifiers, historical payment information, and system-generated predictions related to account activity. As used in this disclosure, a "structured data object" is a data representation formatted according to a defined schema or data model, the structure enabling consistent parsing, storage, and retrieval by the apparatus 100. Without limitation, a structured data object may include standardized fields for patient identifiers, insurance policy numbers, account balances, and the like. The processor 102 may receive these profiles to populate user interface elements displayed to either patients or administrators, thereby supporting personalized data visualization and communication workflows. Without limitation, event data 114 may be received by the processor 102 from multiple system endpoints, including billing transaction logs, insurance claim systems, communication tracking modules, and the like. As used in this disclosure, a "billing transaction log" is a digital record of financial operations performed within a healthcare billing system. Without limitation, the record may be configured to capture payment submissions, refunds, adjustments, and claim statuses. As used in this disclosure, a "communication tracking module" is a component of the apparatus 100 configured to record, manage, or analyze exchanges between patients and healthcare or billing entities. In a non-limiting example, the communication tracking module may store chat transcripts, email exchanges, or notification events associated with patient interactions. The processor 102 may receive event data 114 each time a billing transaction occurs, such as when a patient submits a payment, an insurance claim is processed, or a billing message is sent to a patient portal. The processor 102 may further receive event data 114 in response to real-time interactions, such as when a patient responds to a chatbot prompt or updates an insurance document through the user interface. In an embodiment, this event data 114 may be received continuously or in near real time to enable predictive updates of patient account information and dynamic modification of the user interface structure. Without limitation, processor 102 may receive the described information from both automated enterprise systems and user-driven interfaces at different points in the patient billing workflow. The timing and source of receipt may depend on whether the data originates from a background synchronization process, an administrative update, or a live interaction initiated by a patient, thereby ensuring that the apparatus 100 maintains an accurate and current representation of all patient-related information.

Still referring to FIG. 1, processor 102 is configured to generate a prediction 116 associated with the batch data 106. As used in this disclosure, a "prediction" is a computational determination generated by the processor 102 that estimates or infers one or more outcomes, classifications, or data conditions associated with the batch data 106, subject data 108, or event data 114. The prediction 116 may be used to determine or guide subsequent operations of the apparatus 100, including dynamic user interface generation, prioritization of data review, or communication of relevant information to patients or administrative users. In a non-limiting example, the processor 102 may generate the prediction 116 by executing one or more artificial intelligence models, statistical algorithms, machine learning routines configured to analyze patterns within the batch data 106, and the like. The prediction 116 may represent a probability of patient payment, a likelihood of missing information, a risk classification, or a categorical assignment such as a patient category. In an embodiment, the prediction 116 may be generated using a supervised learning model trained on historical patient account data, wherein the training data includes known inputs and corresponding outcomes. For example, without limitation, the training data may include past patient demographic information, payment histories, insurance claim results, communication frequency, and payment timeliness labels. The model may learn correlations between these inputs and the observed payment outcomes, allowing the processor 102 to predict future behavior for new subject profiles 112. In another embodiment, the processor 102 may employ an unsupervised learning algorithm, such as clustering or dimensionality reduction, to identify latent patterns or groupings within the batch data 106 that are not explicitly labeled. Without limitation, this may include identifying subgroups of patients with similar financial behaviors or response tendencies to billing communications. In another embodiment, the prediction 116 may be generated using a hybrid approach combining rule-based heuristics with neural network models or regression algorithms. For example, without limitation, the processor 102 may first apply a decision tree or logistic regression model to derive an initial probability score and then refine that score using a deep learning model trained on patient communication patterns. The training data used to generate such predictive models may include both structured and unstructured data types. Structured data may include numeric or categorical variables such as account balances, insurance status, payment frequency, outstanding claims, and the like. Unstructured data may include text-based information, such as chatbot transcripts, billing correspondence, patient feedback messages, and the like. In an embodiment, the training data may include temporal features such as payment timing intervals, claim submission timestamps, and user interface interaction histories. For example, without limitation, the processor 102 may generate the prediction 116 by applying a trained neural network model to the received batch data 106 to produce a probability score indicating the likelihood of successful payment completion. Alternatively, a regression-based algorithm may generate a continuous prediction 116 value representing the expected payment amount or time to resolution. The apparatus 100 may then use the prediction 116 to adapt the graphical user interface, such as by displaying tailored payment options, generating follow-up chatbot prompts, or prioritizing administrative review tasks. In an embodiment, the processor 102 may generate a prediction 116 that enables the apparatus 100 to perform intelligent, data-driven adjustments to its user interface and operational behavior based on historical patterns and real-time patient information.

With continued reference to FIG. 1, the prediction 116 may include one or more of interpolation data 128 and an adjustment value 130, wherein the adjustment value 130 is generated as a function of the batch data 106. As used in this disclosure, "interpolation data" is synthetically generated data produced by the processor 102 to supplement, estimate, or replace missing or uncertain information within the batch data 106, subject data 108, or event data 114. Without limitation, interpolation data 128 may be generated using contextual analysis, statistical interpolation, regression modeling, machine learning inference based on previously observed data patterns, and the like. In a non-limiting example, interpolation data 128 may include an inferred insurance provider name based on regional trends, an estimated payment date derived from prior transaction intervals, an approximated demographic value inferred from correlated patient records, and the like. As used in this disclosure, an "adjustment value" is a numerical or categorical modifier generated by the processor 102 as a function of the batch data 106. Without limitation, the modifier may be configured to refine, scale, or recalibrate one or more elements of a prediction 116 or data field. In a non-limiting example, the adjustment value 130 may represent a confidence weighting, correction factor, normalization coefficient, and the like applied to predicted outcomes or interface parameters. Without limitation, the adjustment value 130 may be computed by analyzing deviations between predicted and historical results, aggregating contextual factors such as patient category or account status, or applying learned correction terms derived from model training data. In an embodiment, the adjustment value 130 may be used by the apparatus 100 to refine predictive accuracy, dynamically modify user interface elements, or update internal scoring logic in response to new or changing patient data.

With continued reference to FIG. 1, in a non-limiting example, "interpolation data" may be consistent with one or more aspects of the "interpolative data" described in U.S. patent application Ser. No. 19/396,841, filed on Nov. 21, 2025, titled "APPARATUS AND METHOD FOR DISPLAYING AN UPDATED MODIFIED BATCH," which is incorporated by reference herein in its entirety.

With continued reference to FIG. 1, in a non-limiting example, "adjustment data" may be consistent with one or more aspects of the "modified batch" and/or the "updated modified batch" described in U.S. patent application Ser. No. 19/396,841, filed on Nov. 21, 2025, titled "APPARATUS AND METHOD FOR DISPLAYING AN UPDATED MODIFIED BATCH," which is incorporated by reference herein in its entirety.

Still referring to FIG. 1, processor 102 is configured to generate a user interface element 118 as a function of the prediction 116 and the batch data 106. As used in this disclosure, a "user interface element" is a visual, interactive, or display-based component generated by the processor 102 and presented on a client device. Without limitation, the user interface element 118 may facilitate communication, data entry, or information exchange between a user and the apparatus 100. The user interface element 118 may be dynamically generated, modified, or updated as a function of the prediction 116 and the batch data 106 to present relevant content, request information, or visually represent analytical results. In a non-limiting example, a user interface element 118 may include a chatbot field 132 configured to display conversational prompts and receive natural language responses from a patient regarding billing or insurance information, and the like. In an embodiment, a user interface element 118 may include a graphical input field such as a text box or dropdown menu allowing a user to confirm demographic details or select payment options. Without limitation, a user interface element 118 may include a visual display panel that presents prediction 116 results such as payment probability scores, account balances, or insurance coverage summaries. In another embodiment, the user interface element 118 may include a notification banner or dialog window generated in response to the prediction 116, prompting the user to review or verify specific data entries identified as incomplete or uncertain. In another non-limiting example, the user interface element 118 may include a dynamic chart or progress bar configured to visualize predictive outcomes, account completion status, or user interaction metrics. For example, without limitation, the apparatus 100 may generate a graphical payment plan selector allowing a patient to choose between multiple installment options predicted to align with the patient's financial behavior. As used in this disclosure, a "graphical payment plan selector" is a user interface element 118 generated by the processor 102 and displayed on a client device, the element being configured to visually present and enable selection among multiple payment plan options generated as a function of the prediction 116 and the batch data 106. The graphical payment plan selector may include interactive visual components that allow a user to compare, adjust, or confirm payment terms directly within the graphical interface. In a non-limiting example, the graphical payment plan selector may display selectable options representing different installment schedules, payment amounts, or due date ranges. In an embodiment, the graphical payment plan selector may include buttons, sliders, or selectable icons allowing a patient to customize payment preferences such as frequency or duration, while displaying real-time updates to total cost or projected completion dates. Without limitation, the graphical payment plan selector may further display visual indicators such as color-coded confidence scores, progress bars, or predictive outcomes reflecting the likelihood of successful completion for each option. For example, without limitation, the apparatus 100 may generate a graphical payment plan selector that presents three payment options derived from the prediction 116, where each option displays the associated payment interval, amount, and estimated account closure date. The patient may interact with the selector through touch, cursor, or chatbot input to confirm a preferred plan, causing the apparatus 100 to update the corresponding subject profile 110 and display a confirmation message within the graphical user interface. Without limitation, the user interface element 118 may serve as the adaptable communication layer between the apparatus 100 and one or more users, providing contextually relevant, predictive, and interactive functionality for patient account management and data accuracy enhancement.

With continued reference to FIG. 1, the user interface element 118 may include a chatbot field 132. As used in this disclosure, a "chatbot field" is a user interface element 118 generated by the processor 102 and displayed within a graphical user interface. The chatbot field 132 may be configured to facilitate conversational interaction between a user and the apparatus 100 through natural language input and output. As used in this disclosure, a "user" is an individual or entity that interacts with the apparatus 100. Without limitation, the user may interact with the apparatus 100 through a client device user interface element 118, and the like, to view, provide, or manage information associated with the batch data 106, subject data 108, event data 114, and the like. Without limitation, the user may engage with the apparatus 100 to enter data, review predictions, confirm account details, or perform administrative or analytical functions. In a non-limiting example, the user may be a patient accessing a billing portal or chatbot field 132 to review payment options, update insurance information, or communicate with a healthcare provider. In another embodiment, the user may be an administrator, such as a billing specialist or account manager, reviewing patient account data, verifying submitted information, or overseeing payment collection through an administrator interface. Without limitation, a user may include a healthcare provider, financial counselor, or system operator authorized to interact with the apparatus 100 for monitoring, configuration, or reporting purposes. Without limitation, the user may interact with the apparatus 100 through a graphical interface that presents system-generated information and enables responsive, data-driven interaction.

With continued reference to FIG. 1, the chatbot field 132 may include a text or speech interface that presents system-generated prompts and receives user responses, allowing the apparatus 100 to collect data, confirm information, or guide the user through specific workflows. In a non-limiting example, the chatbot field 132 may display a conversational prompt requesting missing patient information, such as "Please confirm your insurance provider," and may receive the patient's typed or spoken response. In an embodiment, the chatbot field 132 may guide a user through payment setup by sequentially asking questions such as "Would you like to pay in full or create a payment plan?" followed by "Select the number of installments that work best for you." Without limitation, the chatbot field 132 may provide contextual explanations or feedback, such as notifying the user of outstanding balances, confirming submission of uploaded documents, or summarizing selected payment options. For example, without limitation, the chatbot field 132 may be presented on a patient's mobile device as part of a billing portal, where the apparatus 100 uses predictive analysis to generate tailored chatbot messages encouraging timely payment completion or correction of missing demographic data. In another example, an administrator-facing chatbot field 132 may provide guidance regarding account verification or system alerts, enabling efficient communication between human users and the automated processing components of the apparatus 100.

With continued reference to FIG. 1, the at least a processor 102 may be further configured to receive, using a natural language processor 134, text data input into the chatbot field 132 and encode the text data 136 by segmenting the text data 136 into linguistic units 138 and generating a vector representation 140 of the segmented text as a function of a contextual embedding model 142. As used in this disclosure, a "natural language processor" is a software or hardware component executed by the processor 102 and configured to process, analyze, and interpret human language input. In an embodiment, the natural language processor may receive through a user interface element 118 such as a chatbot field 132, input data as described herein, such as batch data 106, subject data 108, subject category 152, event data 114, text data 136, prior user input 146, and the like. The natural language processor 134 may convert raw text or speech into structured data that the apparatus 100 can analyze or respond to. In a non-limiting example, the natural language processor 134 may identify user intent, extract keywords, classify topics, or determine sentiment from patient-entered text to guide the apparatus 100 in generating appropriate responses or interface modifications. In a non-limiting example, the natural language processor 134 (NLP) of the apparatus 100 may employ one or more types of computational language models or architectures, each trained to interpret, classify, or generate text data 136 based on patient or administrative interactions. The NLP may be implemented using traditional rule-based systems, statistical models, or advanced artificial intelligence frameworks trained on domain-specific language data from healthcare and billing contexts. In an embodiment, the NLP may include a rule-based language processor configured to analyze text input according to predefined linguistic rules, keyword mappings, and syntactic structures. Without limitation, the NLP may be trained by defining patterns or templates that recognize specific types of user intent. For example, without limitation, a rule-based NLP may detect phrases such as "set up a payment plan" or "update my insurance" and associate each phrase with a corresponding system action or user interface response. In another embodiment, the NLP may employ a statistical language model, such as a n-gram or hidden Markov model, which determines probable word sequences based on the frequency of observed patterns in training data. The statistical NLP may be trained on large corpora of historical patient communications, chatbot transcripts, billing correspondence, and the like to learn common phrasing, vocabulary, and intent expressions. Without limitation, the training may allow the apparatus 100 to predict the most likely user intention or next word in a conversation, improving its conversational fluency. In a further embodiment, the NLP may include a machine learning-based model, such as a logistic regression classifier, decision tree, or support vector machine trained on labeled examples of text input. The training data for such models may include manually annotated samples indicating user intent categories, such as "provide payment," "verify information," or "ask for assistance." The model may learn to classify new text input into these categories by recognizing linguistic features such as specific word combinations or sentence structures. In another embodiment, the NLP may incorporate a deep learning model, such as a recurrent neural network (RNN), long short-term memory (LSTM) network, or transformer-based model, including but not limited to BERT, GPT, or ROBERTa architectures. These models may be trained using large-scale datasets that include both general conversational language and domain-specific billing and healthcare communication data. For example, without limitation, the training data may include anonymized chatbot conversations, patient support logs, and billing-related messages labeled with contextual outcomes or intents. The model may be fine-tuned to recognize terminology specific to medical billing, such as "copay," "deductible," or "claim denial," while also understanding conversational nuances and polite phrasing used by patients. In another embodiment, the NLP may include a hybrid processor that combines rule-based components with deep learning-based contextual embedding models. This configuration may allow the apparatus 100 to handle both structured command recognition and open-ended conversational understanding. The rule-based component may manage predictable queries, such as "What is my balance?" while the deep learning component interprets more complex or ambiguous statements, such as "I think I was charged twice for my last visit." Training of each NLP architecture may involve preprocessing steps such as tokenization (or segmenting), part-of-speech tagging, stop-word removal, word embedding generation, and the like. In a non-limiting example, the deep learning NLP models may be trained using supervised or semi-supervised learning techniques, where text data 136 is annotated with expected intents, responses, or sentiment labels. The training process may include iterative optimization of model parameters to minimize prediction 116 error across large datasets. Without limitation, the apparatus 100 may continuously retrain or fine-tune its NLP using new communication data collected from patient interactions. In an embodiment, the ongoing learning process may enable the NLP to adapt to emerging linguistic patterns, updated billing terminology, and evolving user behavior, thereby improving accuracy, responsiveness, and contextual understanding in patient communication workflows.

With continued reference to FIG. 1, As used in this disclosure, a "text input" is a string of characters, words, or phrases. Without limitation, the text input may be provided by a user and entered into a user interface element 118 such as a text box or chatbot field 132. In a non-limiting example, the text input may include responses to chatbot prompts, such as a patient entering their employer's name, insurance provider, preferred payment option, and the like. In an embodiment, the text input may also include free-form statements or inquiries that are processed by the natural language processor 134 for meaning extraction. As used in this disclosure, "text data" is digital information representing written language. In an embodiment, the text data 136 may be received or processed by the apparatus 100. In a non-limiting example, text data 136 may include alphanumeric content, punctuation, structured responses, and the like derived from patient communication, chatbot interactions, administrative inputs, and the like. Without limitation, text data 136 may be preprocessed by the natural language processor 134 to remove formatting inconsistencies or to standardize language representation before analysis. In a non-limiting example, text data 136 may be preprocessed by the natural language processor 134 to ensure that the input is consistent, structured, and suitable for computational analysis. Without limitation, this preprocessing stage may include multiple operations performed sequentially or in parallel, each designed to normalize raw language data and improve the accuracy of downstream prediction 116 or interpretation tasks. In an embodiment, preprocessing may include removing formatting inconsistencies, such as extra whitespace, punctuation errors, irregular capitalization, and the like to create a uniform text representation. For example, without limitation, the natural language processor 134 may convert all text to a standardized case format, remove special characters that do not contribute meaning, and correct encoding anomalies introduced by data entry or device variations. In another embodiment, preprocessing may include standardizing language representation by applying techniques such as lemmatization, stemming, or spell correction. Without limitation, lemmatization may reduce words to their base form, for instance, "payments" to "payment," while spell correction may resolve common typographical errors introduced by user input. The natural language processor 134 may normalize contractions or abbreviations, for example, converting "I'm" to "I am" or "DOB" to "date of birth," to maintain linguistic consistency across patient interactions. In another embodiment, preprocessing May include token filtering and stop-word removal, where common filler words such as "a," "the," and "of" are excluded from analysis to focus on semantically relevant terms. The natural language processor 134 may also apply language detection and encoding normalization to accommodate multilingual inputs or text originating from various user interface devices. For example, without limitation, a patient may enter the text "pls upd8 my insur info asap." The natural language processor 134 may preprocess this text by expanding abbreviations, correcting spelling, and converting the input to "please update my insurance information as soon as possible." In a non-limiting example, the natural language processor 134 may employ one or more computational tools or software frameworks to perform preprocessing of the text data 136, each configured to detect and correct linguistic inconsistencies, abbreviations, or informal phrasing before further analysis.

In an embodiment, preprocessing may be performed using string normalization utilities and text-cleaning libraries such as Python-based frameworks including spaCy, NLTK, or TextBlob, which are configured to handle lowercasing, punctuation stripping, and whitespace standardization. These utilities may also identify non-alphanumeric characters and remove formatting artifacts introduced by mobile device keyboards or speech-to-text input systems.

In another embodiment, the natural language processor 134 may use abbreviation and slang expansion modules trained on domain-specific lexicons or public corpora. Without limitation, these modules may include pretrained models such as FastText or custom dictionaries tailored for healthcare and billing contexts. For example, the abbreviation "insur" may be expanded to "insurance," "upd8" to "update," and "asap" to "as soon as possible." The processor 102 may employ rule-based pattern recognition or embedding similarity techniques to identify shortened forms, phonetic spellings, or texting slang and replace them with standard equivalents.

In a further embodiment, the natural language processor 134 may incorporate spell correction algorithms using methods such as edit distance computation or probabilistic models such as noisy channel algorithms. These methods may analyze word proximity in the embedding space or reference frequency-based language models to identify likely intended words. For instance, if a user enters "paymnt," the system may automatically correct it to "payment" based on contextual similarity to known terms in its vocabulary. In an embodiment, the natural language processor 134 may apply lemmatization and stemming tools, such as WordNetLemmatizer or SnowballStemmer, to reduce inflected words to their canonical base form. As used in this disclosure, "lemmatization and stemming tools" are computational language processing components executed by the processor 102 and configured to normalize text data 136 by reducing words to their base or root forms. These tools enable consistent representation of linguistic content, allowing the apparatus 100 to analyze related words as equivalent expressions for prediction 116, classification, or natural language understanding tasks. In a non-limiting example, lemmatization refers to the process of converting an inflected word into its canonical dictionary form, or lemma, based on grammatical and contextual information. For instance, without limitation, the words "pays," "paying," and "paid" may each be reduced to the lemma "pay." Lemmatization relies on morphological and part-of-speech analysis to ensure that the correct base form is selected according to context. In contrast, stemming refers to a heuristic process that removes affixes such as prefixes or suffixes to produce a simplified root form. For example, without limitation, the words "payment," "paying," and "payer" may each be reduced to the stem "pay." Stemming may use rule-based truncation methods without regard to grammatical context, offering faster though less precise normalization than lemmatization. In an embodiment, the processor 102 may employ lemmatization and stemming tools such as WordNet-based lemmatizers or Snowball stemmers to process incoming text data 136 within chatbot interactions. Without limitation, these tools may be used to standardize patient-entered terms such as "payments" and "paying" into a single normalized form, thereby improving consistency in semantic analysis, intent detection, and predictive modeling performed by the apparatus 100. This may ensure that variations such as "payments," "paying," and "paid" are normalized to "payment," maintaining consistency for predictive modeling. Without limitation, the processor 102 may employ context-aware correction models powered by deep learning, such as transformer-based models including BERT, T5, or GPT fine-tuned for text normalization. These models may learn contextual relationships and grammar patterns, allowing the apparatus 100 to correct not only spelling and abbreviation errors but also syntactic irregularities, ensuring that sentences retain proper meaning. For example, without limitation, when a patient enters the message "pls upd8 my insur info asap," the natural language processor 134 may first identify and expand abbreviations using a rule-based abbreviation expander, then apply a contextual embedding model 142 to refine grammar and ensure semantic accuracy, resulting in "please update my insurance information as soon as possible." Without limitation, the apparatus 100 may employ a combination of deterministic and probabilistic preprocessing tools to transform informal, inconsistent, or abbreviated language into standardized, contextually accurate text suitable for analysis by downstream prediction 116, classification, or chatbot response generation components. The standardized text may then be tokenized, embedded, and analyzed to accurately determine user intent and generate a corresponding response or interface modification. Through this preprocessing pipeline, the apparatus 100 may ensure that all text data 136, regardless of origin, user, or device, is converted into a normalized linguistic format that supports accurate, efficient, and contextually aware natural language understanding. As used in this disclosure, a "linguistic unit" is a discrete segment of text identified during language processing, representing a meaningful element such as a word, phrase, or sub word component. In a non-limiting example, linguistic units 138 may include entire words like "insurance" or "payment," or smaller segments such as prefixes or suffixes that carry linguistic meaning. In an embodiment, linguistic units 138 may be used to preserve contextual relationships during text encoding for natural language understanding. As used in this disclosure, a "vector representation" is a numerical encoding of linguistic or semantic features of text data 136, expressed as a multi-dimensional mathematical vector. The vector representation 140 may allow the apparatus 100 to analyze and compare meanings computationally. In a non-limiting example, the vector representation 140 may encode the semantic similarity between words such that related terms like "payment" and "invoice" occupy nearby positions in vector space. In an embodiment, vector representations may be used as model inputs for generating predictions, determining user intent, or producing chatbot responses. As used in this disclosure, "segmented text" is text data that has been segmented by the natural language processor 134 into a sequence of smaller linguistic units 138 suitable for computational analysis. In a non-limiting example, segmented text may represent a sentence divided into component words, sub words, or characters, such as converting "set up a payment plan" into the tokens or segments "set," "up," "a," "payment," and "plan." Without limitation, segmented text may enable efficient feature extraction and contextual embedding for natural language processing models. As used in this disclosure, a "contextual embedding model" is a computational model that generates vector representations of segmented text while preserving contextual meaning based on the surrounding words or phrases. In a non-limiting example, a contextual embedding model 142 may include transformer-based architectures or deep neural networks configured to generate dynamic word embeddings that vary depending on linguistic context. For example, without limitation, the model may distinguish between the meaning of "charge" in "medical charge" versus "credit card charge." In an embodiment, the contextual embedding model 142 may allow the apparatus 100 to interpret user intent accurately and to generate adaptive chatbot responses or interface updates based on the semantic understanding of text input.

With continued reference to FIG. 1, the at least a processor 102 may be further configured to generate a plurality of user interface elements 144 arranged in a sequence, each user interface element 118 generated in response to a prior user input 146 and display the plurality of user interface elements 144 as an iterative series of prompts 148. As used in this disclosure, "user interface elements" are visual or interactive components generated by the processor 102 and displayed on a client device to facilitate communication, data collection, or information display between a user and the apparatus 100. In a non-limiting example, user interface elements may include chatbot fields, text entry boxes, selectable buttons, dropdown menus, sliders, notification banners, progress bars, visual data panels, and the like that present or receive information as a function of predictions or user interactions. As used in this disclosure, a "sequence" is an ordered arrangement of user interface elements displayed according to a defined temporal or logical order established by the processor 102. In a non-limiting example, a sequence may represent a structured workflow in which each element is presented after a specific event, condition, or user input has occurred, allowing the apparatus 100 to guide the user through a defined interaction flow. As used in this disclosure, a "prior user input" is information or a response provided by the user in relation to a previously displayed user interface element 118, the information being received by the apparatus 100 and used to influence the generation or presentation of subsequent elements. In a non-limiting example, a prior user input 146 may include a response entered into a chatbot field 132, a selection from a dropdown menu, or a confirmed choice in a payment plan selector that determines the next display or prompt. As used in this disclosure, an "iterative series of prompts" is a recurring or sequential presentation of user interface elements, each prompt being generated as a function of prior user input 146 or prediction 116 results to progressively refine or collect information. In a non-limiting example, the iterative series of prompts 148 may include a conversation-like exchange in which the apparatus 100 presents one question or instruction at a time, such as verifying patient identity, confirming insurance details, or selecting a payment option, where each subsequent prompt adapts dynamically based on the user's prior response or the system's predictive output.

With continued reference to FIG. 1, the at least a processor 102 may be further configured to generate a display structure 150 of the user interface element 118 as a function of the prediction 116 and a subject category 152 associated with the subject profile 110. As used in this disclosure, a "display structure" is a visual organization that defines how visual components are spatially and functionally arranged on a display device. In an embodiment, the display structure 150 may be by the processor 102 and rendered within a user interface element 118. In a non-limiting example, the display structure 150 may include one or more graphical regions, panels, containers, layout grids, and the like that may determine the placement, hierarchy, and visibility of interactive components such as text fields, chatbot regions, buttons, charts, or notifications. In an embodiment, the display structure 150 may be dynamically generated or modified as a function of the prediction 116, allowing the apparatus 100 to adapt visual presentation 166 according to contextual or user-specific data. As used in this disclosure, a "subject category" is a classification of a subject profile 110 generated as a function of one or more attributes or behavioral patterns associated with the subject data 108 or event data 114. In a non-limiting example, the subject category 152 may represent classifications such as insured, uninsured, partial-coverage, high-risk nonpayment, reliable payment, new patient, and the like. In an embodiment, the subject category 152 may include classifications based on demographic data, communication preferences, or engagement history, which may influence how information is displayed or requested from the user. In a non-limiting example, the processor 102 may generate the display structure 150 of the user interface element 118 as a function of both the prediction 116 and the subject category 152 to ensure that the displayed content is personalized and contextually relevant. For instance, without limitation, if the prediction 116 indicates a high likelihood of nonpayment and the subject category 152 corresponds to an uninsured patient, the processor 102 may generate a display structure 150 emphasizing financial assistance options, simplified payment plans, chatbot prompts offering payment support, and the like. Conversely, if the prediction 116 indicates reliable payment and the subject category 152 corresponds to an insured patient, the processor 102 may generate a streamlined display structure 150 showing a summary of account status, auto-payment options, fewer input fields, and the like. Without limitation, the apparatus 100 may continuously adapt the display structure 150 in real time based on new data or feedback, such that the graphical layout, color scheme, or displayed elements adjust dynamically to reflect the user's predicted needs, behavioral patterns, or financial classification. In a non-limiting example, the apparatus 100 may generate a display structure 150 that adapts to a prediction 116 associated with a patient's likelihood of payment and a subject category 152 corresponding to an uninsured patient. The processor 102 may determine, based on the prediction 116, that the patient is unlikely to complete payment without assistance and may accordingly generate a display structure 150 emphasizing financial guidance. The user interface element 118 may include a chatbot field 132 that begins the interaction with prompts such as "Would you like to see available payment assistance options?" and a graphical payment plan selector displaying alternative payment schedules. The visual layout 154 may prioritize accessibility, using larger text, simplified color schemes, and clearly labeled payment buttons to reduce cognitive load and encourage interaction. In another embodiment, the apparatus 100 may generate a display structure 150 corresponding to a subject category 152 of a reliably paying insured patient. The processor 102 may determine, based on predictive analysis, that minimal manual interaction is required. The display structure 150 may therefore present a condensed account summary with an auto-payment toggle, a visual indicator of billing cycle progress, and an expandable section for viewing prior transactions. Without limitation, the chatbot field 132 may prompt, "Would you like to confirm your automatic billing preferences?" The visual structure may include color-coded confidence indicators derived from the prediction 116, showing green for accounts predicted to remain in good standing and yellow for accounts nearing a payment threshold. As used in this disclosure, a "confidence indicator" is a visual element generated by the processor 102 and displayed within the user interface to represent the relative certainty, reliability, or strength of a prediction 116 generated by the apparatus 100. The confidence indicator may be expressed as a graphical feature such as a color code, bar, icon, or numerical value corresponding to a confidence score derived from the predictive model. In a non-limiting example, the confidence indicator may display a green color or a high numerical percentage to represent strong confidence in timely payment, while a yellow or red color may represent moderate or low confidence, signaling potential risk. In an embodiment, the confidence indicator may dynamically update as new batch data 106 or event data 114 is received, allowing both patients and administrators to visually assess prediction 116 stability and account performance in real time. As used in this disclosure, a "payment threshold" is a defined value or condition established by the apparatus 100 that represents a predicted or observed point at which a payment-related event requires attention, intervention, or adjustment. In a non-limiting example, the payment threshold may correspond to a specific balance amount, due date interval, or predicted probability of delinquency derived from the batch data 106 and event data 114. For instance, without limitation, the payment threshold may be triggered when the apparatus 100 predicts that a patient's payment likelihood has fallen below a predefined percentage or when an account balance exceeds a designated limit. In an embodiment, crossing a payment threshold may cause the processor 102 to modify the display structure 150 by generating visual alerts, changing the color of the confidence indicator, or prompting the chatbot field 132 to offer additional assistance or alternative payment plan options. In another embodiment, the apparatus 100 may generate a display structure 150 tailored to a subject category 152 corresponding to a new patient profile with incomplete demographic data. The processor 102 may determine from the prediction 116 that required fields such as address or insurance provider are missing and may generate a series of user interface elements arranged in an iterative series of prompts 148. For example, without limitation, the first chatbot prompt may request verification of identity information, followed by dynamically generated graphical input fields requesting contact and insurance details. As each input is completed, the processor 102 may reconfigure the display structure 150 to show progress indicators, visual confirmations, adaptive prompts, and the like that guide the user through data completion. Without limitation, the apparatus 100 may generate personalized and prediction-driven display structures that enhance data accuracy, improve patient engagement, and streamline billing interactions across diverse subject categories.

Still referring to FIG. 1, processor 102 is configured to display, using a first client device 120, the user interface element 118. As used in this disclosure, a "client device" is a computing device communicatively connected to the apparatus 100 and configured to display user interface elements. In an embodiment, the client device may transmit user inputs, feedback, and/or event data 114 back to the apparatus 100. The client device may include any electronic device capable of executing graphical display operations, network communications, or interactive input functions. In a non-limiting example, the client device may include a smartphone, tablet computer, desktop computer, laptop, or specialized healthcare terminal configured to operate a web-based or application-based interface that interacts with the apparatus 100 over a secure communication network. In a non-limiting example, the processor 102 may be configured to display a user interface element 118 on a first client device 120 associated with a patient user. The first client device 120 may execute an application or browser-based interface that retrieves display data from the apparatus 100 in response to the prediction 116 and subject profile 110 information. The user interface element 118 may appear as a chatbot conversation panel, graphical payment plan selector, or demographic information form displayed on the patient's mobile device. The processor 102 may render the display structure 150 in a responsive format optimized for the device type, screen size, and accessibility settings of the user. For instance, without limitation, a patient using a smartphone may see simplified button-based selections and conversational chatbot prompts, while a patient using a tablet may view an expanded layout with detailed charts or embedded document upload fields. In an embodiment, the processor 102 may further transmit display instructions and corresponding data packets to the first client device 120 through an encrypted communication protocol such as HTTPS, RESTful API, or WebSocket connection. Without limitation, the apparatus 100 may generate and update the displayed user interface in real time as the patient interacts with the chatbot field 132 or other graphical controls. For example, when the patient confirms an insurance provider or selects a payment plan, the apparatus 100 may immediately update the display structure 150 on the client device to show confirmation messages, payment summaries, or progress indicators. In this manner, the apparatus 100 enables secure, responsive, and adaptive user interaction through the first client device 120, providing a personalized and context-aware communication interface between the patient and the healthcare billing system.

Still referring to FIG. 1, processor 102 is configured to receive feedback data 122 from the first client device 120, wherein the feedback data 122 is associated with the user interface element 118. As used in this disclosure, "feedback data" is information received by the processor 102 from a client device that represents a user's interaction, response, or behavioral input associated with a displayed user interface element 118. The feedback data 122 may include explicit inputs, such as selections, confirmations, or textual responses, and implicit signals, such as interaction timing, navigation patterns, or engagement metrics. The processor 102 may use the feedback data 122 to refine predictions, modify user interface elements, or update subject profiles 112 to improve accuracy and personalization within the apparatus 100. In a non-limiting example, the processor 102 may receive feedback data 122 from a first client device 120 operated by a patient after the display of a chatbot field 132 or graphical payment plan selector. The feedback data 122 may include a patient's typed message confirming an insurance provider, a selected payment option, a rejection of a proposed plan, and the like. In an embodiment, the feedback data 122 may include behavioral information such as the time taken to respond, skipped prompts, repeated requests for clarification, and the like, which may indicate user hesitation or uncertainty. Without limitation, the feedback data 122 may be encoded and transmitted to the processor 102 in real time through secure communication protocols for immediate analysis and system adaptation. In another embodiment, the apparatus 100 may process the feedback data 122 to adjust or regenerate user interface elements dynamically. For example, without limitation, if the feedback data 122 indicates that a patient declined a suggested payment plan, the processor 102 may generate a new display structure 150 presenting alternative plan options or initiate a chatbot prompt offering financial counseling resources. If the feedback data 122 shows high engagement, such as rapid confirmations or completed form submissions, the apparatus 100 may interpret this as high user confidence and reduce the number of iterative prompts displayed. Without limitation, through these operations, the processor 102 uses feedback data 122 to create a responsive, adaptive, and context-aware interface that continuously refines user interaction and enhances communication efficiency within the healthcare billing environment.

Still referring to FIG. 1, processor 102 is configured to generate a modified user interface element 124 as a function of the prediction 116 and the feedback data 122. As used in this disclosure, a "modified user interface element" is a regenerated user interface element. In an embodiment, the modification of the modified user interface element 124 may be performed by the processor 102 as a function of both a prediction 116 and corresponding feedback data 122 received from a client device. The modified user interface element 124 may represent a real-time adaptation of the visual or interactive structure of the interface to reflect new contextual information, corrected user data, or updated system predictions. In a non-limiting example, the processor 102 may generate a modified user interface element 124 by updating the layout, displayed content, available input options, and the like in response to patient feedback. For instance, without limitation, when a patient declines a proposed payment plan through a chatbot field 132, the feedback data 122 may trigger a recalculation of affordability predictions, causing the processor 102 to generate a modified interface presenting alternative plans, financial aid links, or simplified installment options. Without limitation, this modification may include changing color indicators, adding or removing buttons, or updating chatbot prompts to reflect the new prediction 116 of the apparatus 100 of the patient's financial likelihood or engagement level. Without limitation, the generation of the modified user interface element 124 may rely on a combination of real-time rendering engines, adaptive layout algorithms, and predictive interface logic executed by the processor 102. As used in this disclosure, a "real time rendering engine" is a software framework or processing module executed by the processor 102 and configured to dynamically generate, update, or redraw graphical user interface elements on a client device in response to system events or user interactions without requiring a full page or application reload. In a non-limiting example, the real time rendering engine may manage the visual state of the user interface by updating only the components that have changed, thereby maintaining responsiveness and visual continuity. In an embodiment, the real time rendering engine may employ technologies such as virtual DOM rendering, incremental repainting, or reactive programming architectures that allow the apparatus 100 to instantly reflect modifications such as updated chatbot prompts, newly generated payment plan options, or revised color coded confidence indicators on the display structure 150 as soon as feedback data 122 or predictions are processed. Without limitation, this enables smooth, adaptive transitions that provide users with immediate visual feedback. As used in this disclosure, an "adaptive layout algorithm" is a computational method executed by the processor 102 that determines the spatial arrangement, positioning, and visibility of user interface elements. In an embodiment, the adaptive layout algorithm may adjust the spatial arrangement, positioning, and visibility of user interface elements based on device type, screen resolution, user behavior, or predictive context. In a non-limiting example, an adaptive layout algorithm may automatically resize, reorder, or reformat graphical components such as input fields, chatbot regions, and payment panels to optimize usability and accessibility on a variety of client devices 172. In an embodiment, the adaptive layout algorithm may analyze factors such as user input frequency, navigation patterns, or interaction confidence to prioritize relevant content and reduce visual clutter. Without limitation, the algorithm may reflow a display structure 150 to present simplified input fields for mobile users or expand detailed information panels for administrative devices, ensuring consistent functionality and intuitive interaction across all display environments. As used in this disclosure, "predictive interface logic" is a decision making framework executed by the processor 102 that uses predictive outputs, user feedback, and contextual data to determine how and when to modify the graphical user interface. In a non-limiting example, predictive interface logic may combine results from a machine learning prediction module with ongoing interaction data such as sentiment analysis of chatbot text, response delays, or engagement metrics to anticipate user needs and adjust the interface accordingly. In an embodiment, the predictive interface logic may identify when a user is struggling with data entry, detect potential payment hesitancy, or infer missing demographic information and then trigger updates to the display structure 150 or chatbot behavior. Without limitation, this logic may include reinforcement learning routines or rule based inference models that continuously refine interface behavior over time, enabling the apparatus 100 to provide personalized, adaptive, and context aware user experiences driven by both predictive intelligence and real time interaction analysis. In an embodiment, the apparatus 100 may employ a component based rendering framework such as a virtual DOM or reactive UI engine that enables partial updates of graphical components without full reloading of the display. As used in this disclosure, a "component based rendering framework" is a software architecture that structures a graphical user interface into modular, reusable components, each representing an independent unit of functionality or display. The component based rendering framework may allow the apparatus 100 to generate, update, and manage each user interface element 118 separately, enabling efficient real time rendering and dynamic modification without reloading the entire display structure 150. In a non-limiting example, each component within the component based rendering framework may correspond to a discrete graphical or functional element such as a chatbot panel, payment selector, confirmation dialog, or progress indicator. The processor 102 may render or update only the affected components in response to prediction 116 results or feedback data 122, thereby reducing computational load and improving response time. In an embodiment, the component based rendering framework may maintain a virtual representation of the interface state and reconcile changes incrementally, allowing smooth visual updates and fluid transitions. Without limitation, the component based rendering framework may be implemented using reactive or declarative programming principles, in which the processor 102 defines interface behavior as a function of current data and state variables. For instance, when feedback data 122 indicates that a user selected a new payment option, only the corresponding payment summary and confirmation components may be re rendered. Without limitation, the apparatus 100 may employ a component based rendering framework to efficiently manage complex, data driven interfaces and to enable responsive, adaptive user experiences that evolve dynamically with system predictions and user interactions. Continuing, the predictive logic layer may integrate outputs from a machine learning prediction module with a user interaction tracking subsystem to determine which components require reconfiguration. For example, without limitation, if the prediction module identifies an elevated payment risk based on interaction timing or sentiment analysis of chatbot text, the rendering engine may automatically restructure the display to prioritize payment assistance options or provide additional guidance prompts. In another embodiment, the modified user interface element 124 may be generated through context-aware display optimization, in which the apparatus 100 uses stored templates, conditional rendering rules, or reinforcement learning policies to select and display the most effective interface configuration for a given user category. As used in this disclosure, "stored templates" are predefined digital structures or layout configurations maintained in memory 104 to generate or modify user interface elements in response to predictive outcomes or feedback data 122. The stored templates may define visual layouts, interaction flows, or display structures that correspond to specific subject categories, device types, or interface conditions. In a non-limiting example, a stored template may include a layout optimized for payment plan selection, another for demographic data entry, and another for chatbot based communication. In an embodiment, the processor 102 may retrieve and populate a stored template with context specific information, such as patient data, prediction 116 results, or system alerts, allowing rapid assembly of user interface elements without generating them from scratch. Without limitation, the stored templates may be dynamically adjusted through embedded logic or variable placeholders to accommodate personalized content or adaptive design features. As used in this disclosure, "conditional rendering rules" are sets of predefined logical conditions that determine whether, when, and how a user interface element 118 or visual component should be displayed, hidden, or modified. The conditional rendering rules may be based on system predictions, user behavior, or device characteristics, allowing the apparatus 100 to present only relevant content and minimize visual clutter. In a non-limiting example, conditional rendering rules may specify that a chatbot field 132 becomes visible only when the prediction 116 indicates missing data, or that a payment confirmation button is displayed only after a payment plan has been selected. In an embodiment, the conditional rendering rules may include hierarchical dependencies, threshold triggers, and adaptive state transitions that govern the dynamic structure of the visual interface. Without limitation, the processor 102 may update or reevaluate these rules in real time to maintain consistent system logic as new data or feedback is received. As used in this disclosure, "reinforcement learning policies" are machine learning strategies executed by the processor 102 that enable the apparatus 100 to optimize user interface behavior over time through interaction based feedback. The reinforcement learning policies define how the system selects interface actions, such as generating prompts or adjusting visual presentation 166, based on observed user responses and achieved outcomes. In a non-limiting example, the processor 102 may use reinforcement learning to determine the most effective sequence of chatbot prompts for collecting missing data, or to select the visual configuration most likely to increase payment plan completion rates. In an embodiment, the reinforcement learning policies may employ reward signals based on metrics such as completion time, user satisfaction, or payment success, and iteratively refine interface generation strategies through repeated interaction cycles. Without limitation, the reinforcement learning policies may operate alongside rule based logic and predictive models to provide an adaptive, self-improving interface generation system that continuously enhances efficiency, usability, and communication effectiveness. For example, without limitation, a patient categorized as "new uninsured" may receive an interface emphasizing education and assistance, while a "high-confidence insured" user may see a more transactional interface optimized for rapid payment completion. Continuing, the modified user interface element 124 may operate as an intelligent, self-adjusting communication layer that continuously evolves in response to both predictive analytics and direct user behavior, enhancing accuracy, engagement, and overall system efficiency.

With continued reference to FIG. 1, the at least a processor 102 may be further configured to modify a visual presentation 166 of the user interface element 118 by adjusting at least a color scheme 168 and animation sequence 170 as a function of the prediction 116 and the received feedback data 122. As used in this disclosure, a "visual presentation" is the collective graphical appearance and arrangement of elements displayed within a user interface. The visual presentation 166 may be generated and controlled by the processor 102. The visual presentation 166 may define how information, controls, and graphical components are perceived by the user through features such as layout, typography, color, motion, visual emphasis, and the like. In a non-limiting example, the visual presentation 166 may include the rendering of chatbot fields, progress indicators, payment plan selectors, and alert notifications in a cohesive graphical form designed to communicate context or state information. In an embodiment, the processor 102 may modify the visual presentation 166 dynamically in response to prediction 116 results or user interactions to improve clarity, accessibility, and user engagement. As used in this disclosure, a "color scheme" is a defined combination or mapping of colors applied to the visual elements of the user interface, where each color or gradient represents a state, category, or system confidence level. The color scheme 168 may be generated or modified by the processor 102 as a function of the prediction 116 or feedback data 122 to communicate different system conditions to the user. In a non-limiting example, the color scheme 168 may use green tones to represent high confidence in successful payment, yellow tones to indicate pending or uncertain conditions, and red tones to signify overdue accounts or attention required. In another embodiment, the color scheme 168 may adapt to user preferences or accessibility settings, ensuring compliance with visual contrast standards and user readability requirements. As used in this disclosure, an "animation sequence" is a controlled series of graphical transitions or motion effects generated by the processor 102 and used to provide feedback, guide user attention, or visually represent state changes within the user interface. The animation sequence 170 may include timed fades, slides, pulsing effects, or progress transitions that occur when elements are added, removed, or modified. In a non-limiting example, the processor 102 may trigger an animation sequence 170 to fade in a new chatbot prompt, slide a payment plan selector into view, or pulse a confidence indicator when new prediction 116 data becomes available. In a non-limiting example, the processor 102 may modify the visual presentation 166 of a user interface element 118 by adjusting both the color scheme 168 and the animation sequence 170 based on the prediction 116 and the received feedback data 122. For instance, when feedback data 122 indicates user uncertainty or delayed response times, and the prediction 116 suggests low payment likelihood, the processor 102 may shift the visual presentation 166 to a warmer color scheme 168 with gradual motion effects to create a calmer, more reassuring interface. Conversely, when the feedback data 122 indicates strong engagement and the prediction 116 reflects high confidence, the visual presentation 166 may transition to a brighter color scheme 168 with more dynamic animations to convey progress and system responsiveness. Without limitation, the apparatus 100 may employ adaptive visual presentation 166 techniques that communicate prediction 116 outcomes intuitively, reinforce user confidence, and create a personalized, context aware interface experience.

Still referring to FIG. 1, processor 102 is configured to display, using a second client device 126, the modified user interface element 124. As used in this disclosure, a "second client device" is a computing device distinct from the first client device 120, communicatively connected to the apparatus 100 through a secure network, and configured to receive and render updated display structures or user interface elements. The second client device 126 may be operated by a different user or entity, such as a healthcare administrator, billing specialist, or support representative, who monitors, reviews, or acts upon updated patient account information produced by the apparatus 100. In a non-limiting example, the processor 102 may display the modified user interface element 124 on a second client device 126 associated with a billing administrator, wherein the interface reflects the latest patient interaction and prediction 116 data collected from the first client device 120. The modified user interface element 124 may include updated payment status indicators, revised confidence scores, or summarized chatbot transcripts representing the patient's recent responses. Without limitation, the display on the second client device 126 may use a distinct display structure 150 optimized for administrative workflows, including graphical dashboards, sortable data tables, or real time notification panels showing account statuses and system recommendations. In an embodiment, the apparatus 100 may synchronize the display of the modified user interface element 124 across multiple devices by transmitting encoded interface data packets through secure network protocols such as HTTPS or Web-Socket communication. The processor 102 may ensure that updates to patient data, predictions, or interface states are reflected concurrently on both the first and second client devices 172, thereby maintaining real time consistency between patient facing and administrator facing views. For example, without limitation, if a patient selects a new payment plan on the first client device 120, the processor 102 may instantly update the second client device 126 to display the confirmed plan selection, recalculated payment likelihood, and associated billing notes. Without limitation, the apparatus 100 may facilitate coordinated interactions between users, enabling transparent communication and synchronized account management across multiple access points within the healthcare billing environment.

With continued reference to FIG. 1, the at least a processor 102 may be further configured to generate, as a function of the prediction 116, a visual layout 154 comprising one or more dynamic graphical user interface components 156. As used in this disclosure, a "visual layout" is an organized spatial arrangement of graphical and interactive elements displayed within a user interface, as generated by the processor 102 to structure how information is visually presented to the user. The visual layout 154 defines the relative positioning, alignment, and hierarchy of interface components such as text regions, chatbot fields, buttons, menus, icons, and visual indicators. In a non-limiting example, the visual layout 154 may include a top navigation region, a main content panel containing a payment summary, and a side panel displaying a chatbot interaction window. In an embodiment, the visual layout 154 may be dynamically generated as a function of the prediction 116, such that the positioning and prominence of individual components adjust according to patient category, predicted payment likelihood, or user engagement behavior. Without limitation, the visual layout 154 may employ grid based structures, flexible containers, or responsive rendering logic that ensures readability and accessibility across different client devices 172. As used in this disclosure, a "dynamic graphical user interface component" is an interactive visual element generated and controlled by the processor 102 that can change its content, appearance, or behavior in real time as a function of the prediction 116, feedback data 122, or ongoing user interaction. The dynamic graphical user interface component may include interactive modules such as chatbot panels, payment plan selectors, confirmation dialogs, data visualization charts, and adaptive form fields that modify their state in response to system data. In a non-limiting example, a dynamic graphical user interface component may display an updated payment summary when a new prediction 116 is calculated, expand or collapse based on user selection, or change color and animation to reflect account confidence levels. In an embodiment, the processor 102 may control each component through a component based rendering framework, enabling partial updates and adaptive transitions without reloading the entire user interface. In a non-limiting example, the processor 102 may generate a visual layout 154 comprising multiple dynamic graphical user interface components 156 arranged and prioritized based on predictive results. When the prediction 116 indicates high engagement and low payment risk, the processor 102 may emphasize compact, actionable components such as quick pay buttons and simplified account summaries. Conversely, when the prediction 116 identifies missing demographic data or a higher probability of nonpayment, the processor 102 may generate a more detailed layout that includes chatbot prompts for data collection, expandable financial assistance panels, and dynamic progress indicators guiding the user through required input steps. Through these adaptive configurations, the apparatus 100 provides a visually coherent and functionally intelligent interface that evolves in real time based on predictive analysis and interactive feedback.

With continued reference to FIG. 1, the at least a processor 102 may be further configured to generate, within the user interface element 118, an adaptive display region 158 configured to render input modes 160 including one or more of a selectable menu 162 and a graphical control 164. As used in this disclosure, an "adaptive display region" is a dynamically configurable area within a user interface element designed to modify its content, layout, or functionality in real time as a function of predictive results, user interactions, or received feedback data 122. The adaptive display region 158 may expand, collapse, or reconfigure to present relevant input options, graphical indicators, or communication prompts based on contextual needs. In a non-limiting example, the adaptive display region 158 may display a chatbot field 132 when additional patient information is required, replace it with a payment summary panel after confirmation, or highlight urgent notifications when a payment threshold is reached. In an embodiment, the adaptive display region 158 may employ responsive layout techniques, conditional rendering rules, and reinforcement learning policies to tailor visual and interactive content to the user's behavioral patterns, subject category 152, or device capabilities. As used in this disclosure, "input modes" are the mechanisms, formats, or interaction types through which a user provides information to the apparatus 100 using a client device. The input modes 160 may include tactile, textual, graphical, auditory, gestural interactions, and the like, that the processor 102 can interpret as data inputs. In a non-limiting example, input modes 160 may include touchscreen selections, typed responses in a chatbot field 132, voice commands processed through a natural language interface, mouse based manipulation of on screen elements, and the like In an embodiment, the processor 102 may automatically determine which input modality to present or prioritize based on predictive context or device characteristics, thereby optimizing user accessibility and interaction efficiency. As used in this disclosure, a "selectable menu" is a graphical interface component generated within the adaptive display region 158 that presents a list or set of user selectable options, each corresponding to a predefined action, data entry choice, or navigation path. The selectable menu 162 may include dropdown lists, toggle buttons, radio groups, or icon based selections designed to simplify data entry and guide the user toward valid or recommended responses. In a non-limiting example, a selectable menu 162 may present payment frequency options such as monthly, biweekly, or one time, based on the processor's prediction 116 of user category and historical preferences. In an embodiment, the selectable menu 162 may be dynamically updated as the user interacts with other interface elements, allowing real time refinement of available options in accordance with predictive adjustments or feedback data 122. As used in this disclosure, a "graphical control" is an interactive visual mechanism displayed within the user interface that enables the user to perform an action, modify a variable, or provide input through direct manipulation. The graphical control 164 may include buttons, sliders, switches, progress trackers, or draggable icons that translate user gestures or selections into system recognized inputs. In a non-limiting example, a graphical control 164 may allow a patient to adjust payment plan terms using a slider, confirm consent through a tap or click, or expand a data entry field to provide additional details. In an embodiment, the graphical control 164 may incorporate color changes, animation sequences, or visual feedback effects generated by the processor 102 to confirm successful interaction or to indicate system state changes. In a non-limiting example, the processor 102 may generate, within the user interface element 118, an adaptive display region 158 configured to render multiple input modes 160, including both a selectable menu 162 and one or more graphical controls. For instance, when the prediction 116 indicates that a patient prefers self-guided interactions, the adaptive display region 158 may display a selectable menu 162 offering billing plan choices alongside graphical controls for adjusting payment duration or confirming submission. Conversely, when the prediction 116 suggests uncertainty or incomplete data, the adaptive display region 158 may reconfigure to emphasize chatbot guidance, with graphical controls presented as contextual support features. In this manner, the apparatus 100 enables a highly responsive, multimodal interface that adapts both presentation and input mechanisms to the predictive and behavioral context of each user.

With continued reference to FIG. 1, the at least a processor 102 may be further configured to display the modified user interface element 124 on a plurality of client devices 172, and synchronize visual changes 174 between the client devices 172 in real time responsive to the feedback data 122. As used in this disclosure, "visual changes" are modifications to any graphical, structural, or behavioral element of a displayed user interface as generated or controlled by the processor 102. The visual changes 174 may include updates to color, layout, text, animation, icons, or displayed content that occur in response to system events, predictive updates, or received feedback data 122. In a non-limiting example, visual changes 174 may include highlighting an updated payment status, revealing a new chatbot message, adjusting a confidence indicator color, or reconfiguring the visual layout 154 after user input. In an embodiment, visual changes 174 may also include real time rendering transitions, motion effects, or data refreshes designed to maintain continuity across devices and improve user comprehension of dynamic system activity. As used in this disclosure, "real time" is the near immediate processing and transmission of data, updates, or visual changes 174 by the processor 102 with latency sufficiently low to appear instantaneous to the user. Real time operation may ensure that modifications made on one client device are reflected on other connected devices without perceptible delay. In a non-limiting example, the apparatus 100 may achieve real time synchronization using continuous network communication channels, such as Web Socket or streaming APIs, allowing the system to transmit incremental interface updates as soon as new feedback data 122 or prediction 116 results are received. In an embodiment, real time operation may further include asynchronous message handling, local caching, and timestamp alignment to maintain consistency across multiple user interfaces operating concurrently.

With continued reference to FIG. 1, the processor 102 may be configured to display the modified user interface element 124 on a plurality of client devices 172 and synchronize visual changes 174 between them in real time responsive to the feedback data 122. In a non-limiting example, when a patient interacts with a chatbot field 132 on a first client device 120 and submits updated insurance information, the processor 102 may instantly transmit the corresponding feedback data 122 to the apparatus 100, which in turn updates the modified user interface element 124 on a second client device 126 operated by an administrative user. The visual changes 174 may include the appearance of a confirmation message, recalculated payment probability, or updated account status, all synchronized in real time across devices. In an embodiment, the processor 102 may use event driven communication protocols and distributed data synchronization techniques to maintain a consistent interface state across all client devices 172, ensuring that patient and administrator views reflect identical, up to date information. Without limitation, the apparatus 100 may apply version control and conflict resolution logic to prevent discrepancies between devices, enabling seamless collaboration and transparency between multiple users interacting with the same dataset simultaneously.

In an embodiment, the apparatus 100 may display the modified user interface element 124 using a user interface. As used in this disclosure, a "user interface" is a collection of hardware and/or software components configured to enable interaction between a user and a computing device, wherein the user interface facilitates the presentation of data to the user and the reception of input from the user. The user interface may include, without limitation, graphical user interfaces, command-line interfaces, application programming interfaces, voice-based interfaces, haptic interfaces, or augmented reality interfaces. A "graphical user interface," As used in this disclosure, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through display. Additionally, or alternatively, processor 102 be connected to display device. In one or more embodiments, transmitting the modified user interface element 124 may include displaying the modified user interface element 124 at display device using a visual interface.

With continued reference to FIG. 1, the apparatus 100 is an improvement on existing technology for multiple reasons. In an embodiment, the apparatus 100 is an improvement because it integrates real time, prediction 116 driven interface adaptation using diverse and context rich input data to dynamically modify the display structure 150, visual layout 154, and interaction flow of user interfaces across multiple client devices 172. The processor 102 receives and processes multi source input data including patient demographic information, insurance coverage details, billing history, communication logs, and event data 114 describing interactions such as prior payments, missed invoices, or correspondence with healthcare administrators. The apparatus 100 further processes behavioral feedback data 122 such as text responses in chatbot fields, timing of user selections, and navigation sequences within the graphical interface to refine predictive accuracy and user personalization. In a non-limiting example, the apparatus 100 may analyze structured input data such as date of service, outstanding balance, payment method history, and insurance type together with unstructured text data 136 derived from chatbot interactions or patient inquiries. The processor 102 may combine this data within a machine learning prediction module to determine a likelihood of payment completion, a category of user confidence, or a need for clarification. These predictions are then used to generate or modify graphical components including adaptive display regions, selectable menus, or payment plan selectors that respond dynamically to the identified context. For example, if input data indicates repeated deferral of payment and chatbot feedback suggests financial stress, the apparatus 100 may automatically modify the user interface to display a simplified layout with highlighted financial aid options and a chatbot prompt offering assistance. In another embodiment, the apparatus 100 improves upon prior systems by incorporating sensor, device, and environmental data to enhance interaction precision and accessibility. Without limitation, the input data may include device type, screen orientation, user input modality (such as touchscreen or voice input), and network connectivity strength. These parameters allow the processor 102 to determine how best to render visual elements, adjust color schemes, or optimize animation sequences for each device in real time. The apparatus 100 may also integrate external data sources such as electronic health record metadata, patient communication preferences, or institutional payment policies to refine its adaptive behavior. By fusing predictive intelligence with multimodal input data, the apparatus 100 delivers a continuously learning and self-optimizing graphical interface framework that improves usability, accuracy, and operational efficiency across healthcare billing and communication environments.

Figure 2A:
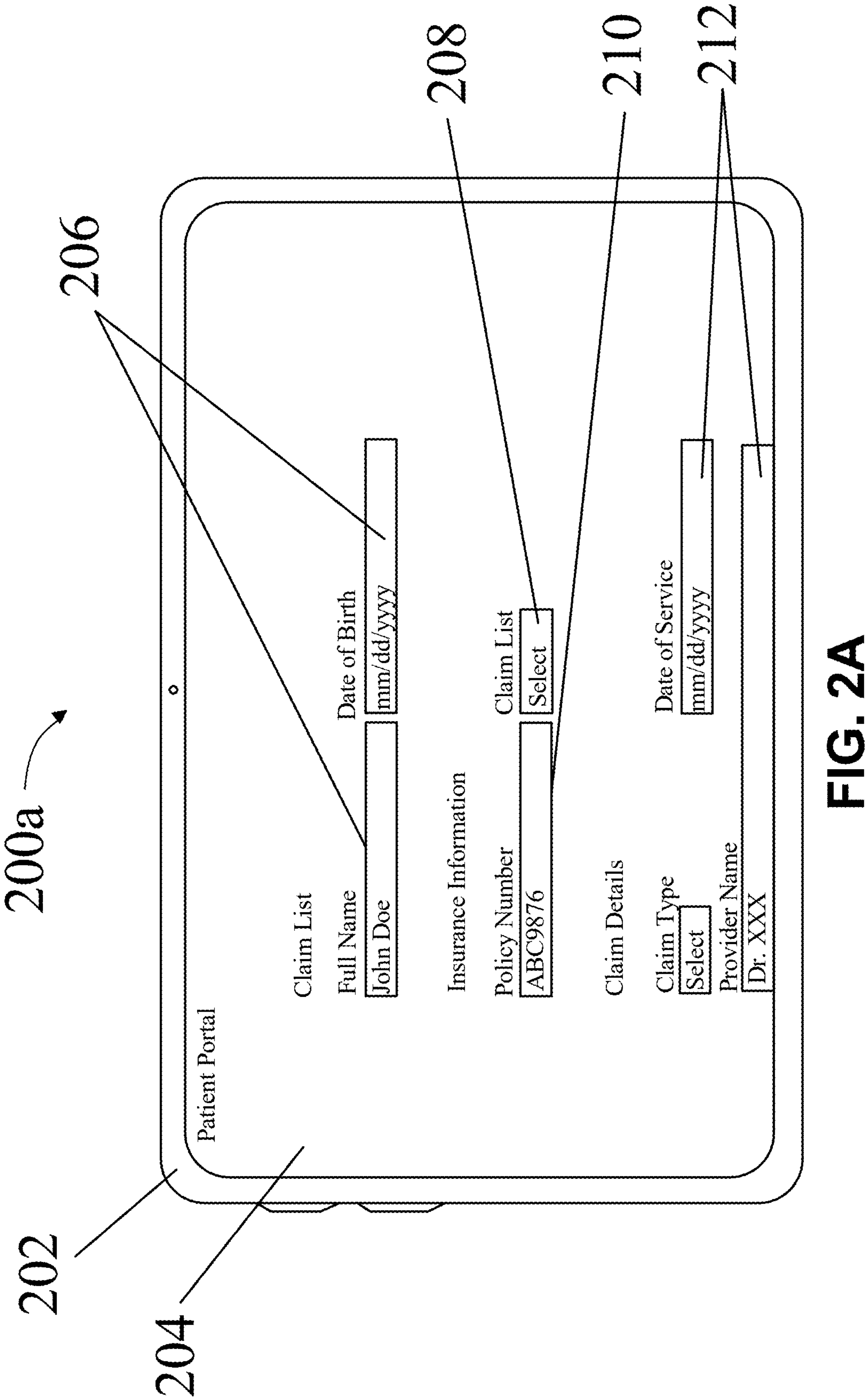
FIG. 2A is an exemplary illustration of a graphical user interface.

Referring now to FIG. 2A, an exemplary illustration 200*a* of a graphical user interface. In an embodiment, the illustration 200*a* may include a first client device 202. Without limitation, the first client device 202 is a computing device such as a tablet, smartphone, or desktop terminal operated by a patient user. The first client device 202 is configured to execute a patient portal application and to communicate with the apparatus 100 over a secure network connection. The first client device 202 may receive and display dynamically generated user interface elements transmitted by the apparatus 100, and may further transmit feedback data based on user interactions, such as completed forms, chatbot responses, or claim submissions. In an embodiment, the illustration 200*a* may include a user interface 204. Without limitation, the user interface 204 is a graphical display environment generated and rendered by the processor 102 of the apparatus 100, configured to present interactive components that allow the patient to input, review, and modify account or claim related data. The user interface 204 may include one or more adaptive display regions, each of which may adjust its layout and content as a function of predictions, user feedback, or subject category. In an embodiment, the illustration 200*a* may include one or more input fields 206. Without limitation, the input fields 206 are text entry regions configured to receive structured or unstructured data from the patient, such as full name, date of birth, policy number, or service date. The input fields 206 may include validation logic, formatting prompts, or predictive text assistance, and may support multiple input modes including touch, voice-to-text, and keyboard entry. In an embodiment, the illustration 200*a* may include a claim list component 208. Without limitation, the claim list component 208 is a selectable menu generated by the apparatus 100 and displayed within the user interface 204 to present active or historical claims associated with the subject profile. The claim list component 208 may dynamically update in real time based on prediction outcomes or user feedback data received from the first client device 202. In an embodiment, the illustration 200*a* may include a claim details panel 210. Without limitation, the claim details panel 210 is an adaptive graphical region configured to display context specific claim data, including claim type, date of service, provider information, and claim status. The claim details panel 210 may expand or collapse based on user selections or may be automatically restructured by the apparatus 100 when the prediction identifies missing or inconsistent claim data requiring user review. In an embodiment, the illustration 200*a* may include a data entry control 212. Without limitation, the data entry control 212 is a graphical control element configured to allow the patient to confirm, submit, or modify claim related information. The data entry control 212 may include visual feedback indicators such as progress bars, color transitions, or animation sequences confirming successful input, and may initiate transmission of feedback data from the first client device 202 to the apparatus 100 for further processing.

Figure 2B:
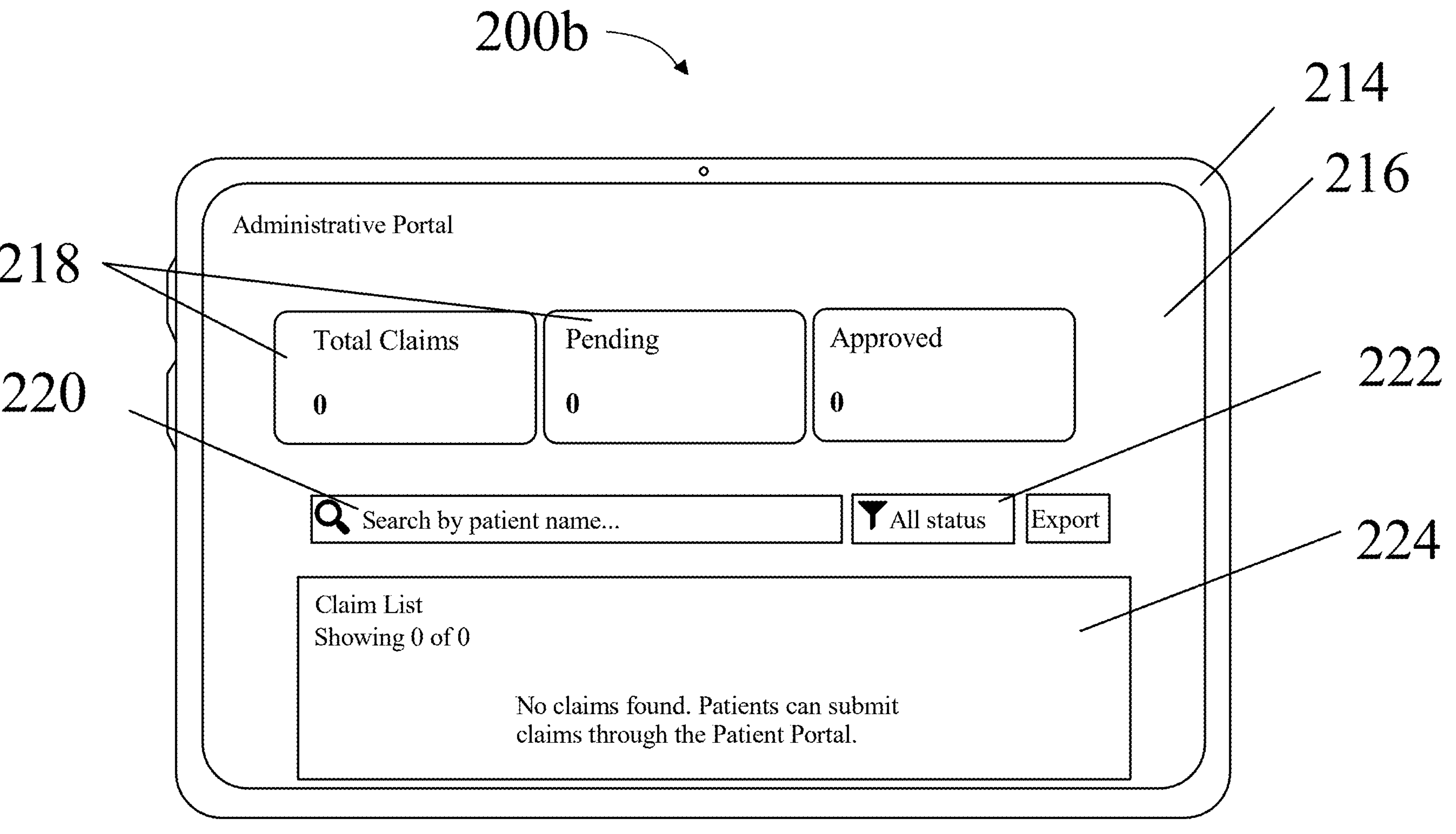
FIG. 2B is an exemplary illustration of a graphical user interface.

Referring now to FIG. 2B, an exemplary illustration 200*b* of a graphical user interface. In an embodiment, the illustration 200*b* may include a second client device 214. Without limitation, the second client device 214 is a computing device such as an administrative workstation, desktop computer, or tablet operated by an authorized administrative user, such as a billing specialist or healthcare provider. The second client device 214 is configured to receive and display the modified user interface element 124 generated by the apparatus 100 and to synchronize visual changes in real time with the first client device 202. In an embodiment, the illustration 200*b* may include an administrative user interface 216. Without limitation, the administrative user interface 216 is a control environment that enables administrative users to monitor patient claim activity, view predictive analytics, and manage approval workflows. The administrative user interface 216 may display multiple dynamic graphical user interface components such as dashboards, search tools, and data visualization widgets. In an embodiment, the illustration 200*b* may include status indicators 218. Without limitation, the status indicators 218 are visual components configured to display claim metrics such as total claims, pending claims, and approved claims. The status indicators 218 may be color coded or include animation sequences reflecting real time system status as updates are received from the apparatus 100. In an embodiment, the illustration 200*b* may include a search field 220. Without limitation, the search field 220 is a text or voice enabled input region configured to receive queries from an administrative user to locate a specific patient, claim, or subject profile. The search field 220 may employ natural language processing for contextual searching and may include autocomplete suggestions derived from historical patient data. In an embodiment, the illustration 200*b* may include filter and export controls 222. Without limitation, the filter and export controls 222 are graphical controls configured to allow sorting, categorizing, and exporting claim data. These controls may include dropdown menus or toggle buttons allowing the administrative user to select claim status filters, generate reports, or export data files for audit and analysis. In an embodiment, the illustration 200*b* may include a claim list display 224. Without limitation, the claim list display 224 is a dynamic display region that presents claim data records synchronized with the patient portal interface 204 of the first client device 202. The claim list display 224 may automatically update in real time as the patient submits new claims, modifies existing information, or provides additional feedback through the chatbot or other interface components.

Figure 3:
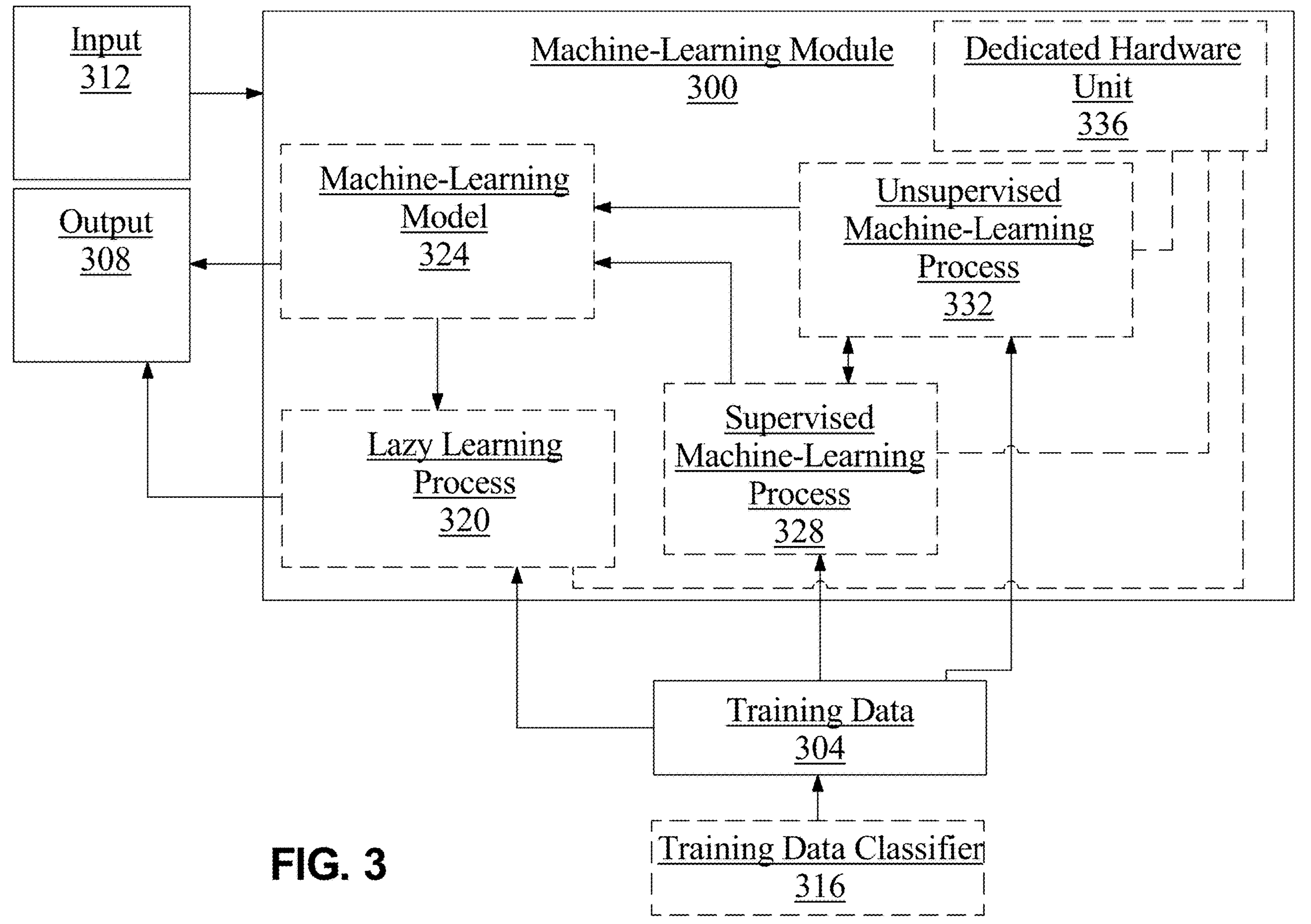
FIG. 3 is a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," As used in this disclosure, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include patient demographic information, insurance coverage details, prior claim submission records, communication transcripts from chatbot interactions, and payment transaction histories, while the output data may include a predicted payment likelihood score, a patient engagement classification, a confidence indicator, or a recommended user interface configuration.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a cohort of patients sharing common demographic characteristics, payment behaviors, or claim activity patterns, such as individuals within a particular insurance plan type, geographic region, or payment risk category, for which a subset of training data may be selected. In an embodiment, the training data classifier 316 may also classify elements of training data to sub-populations based on temporal or behavioral attributes, including frequency of account access, responsiveness to chatbot interactions, or historical compliance with billing schedules. Without limitation, these classifications may enable the apparatus 100 to segment training data into focused subsets that improve the accuracy, speed, and contextual relevance of model training across multiple machine learning algorithms.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include patient demographic records, insurance policy details, historical claim submissions, payment timelines, and chatbot interaction transcripts as described above as inputs, and predicted payment likelihood scores, engagement classifications, confidence indicators, or optimized user interface configurations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, As used in this disclosure, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry.

Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
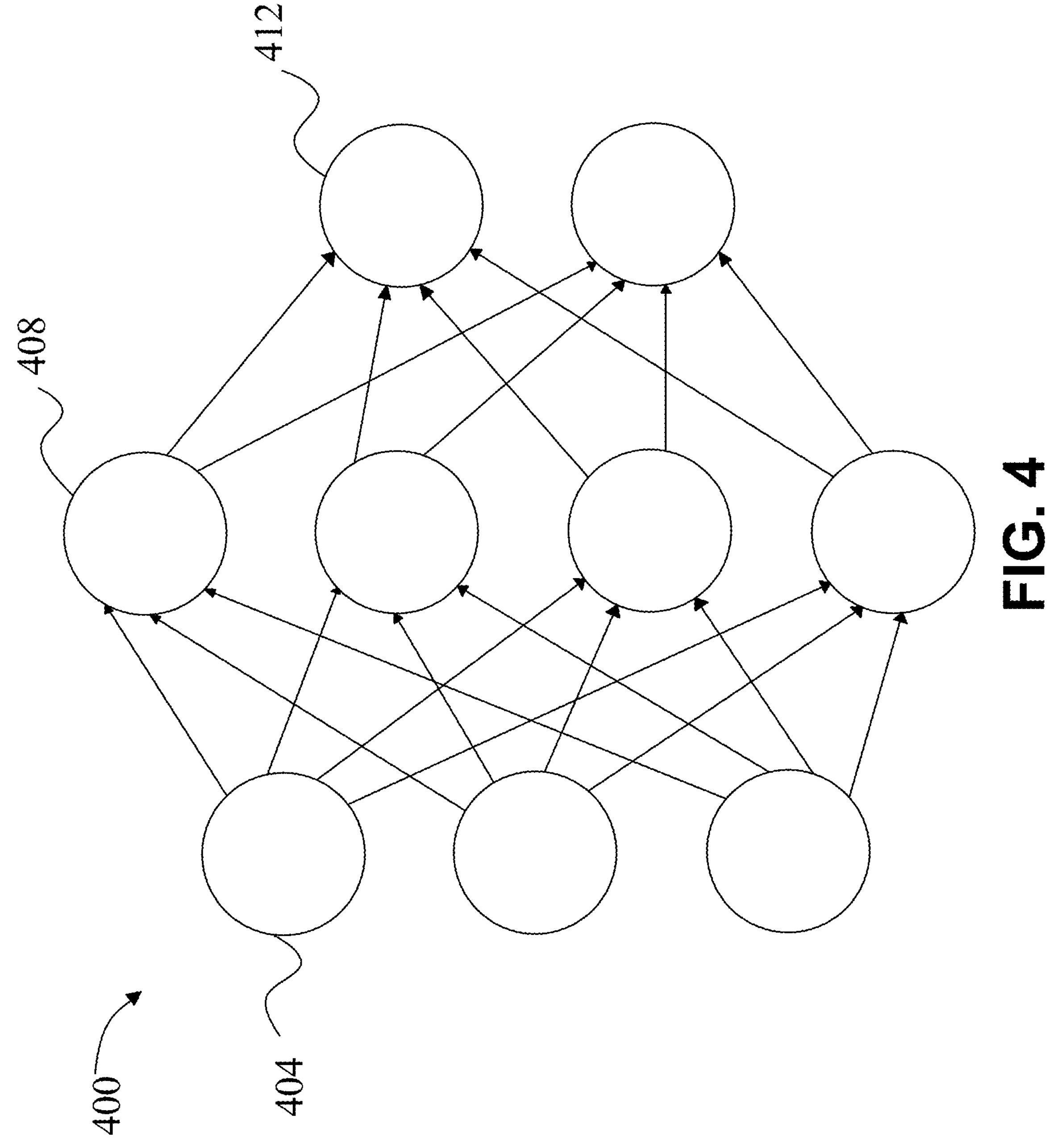
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
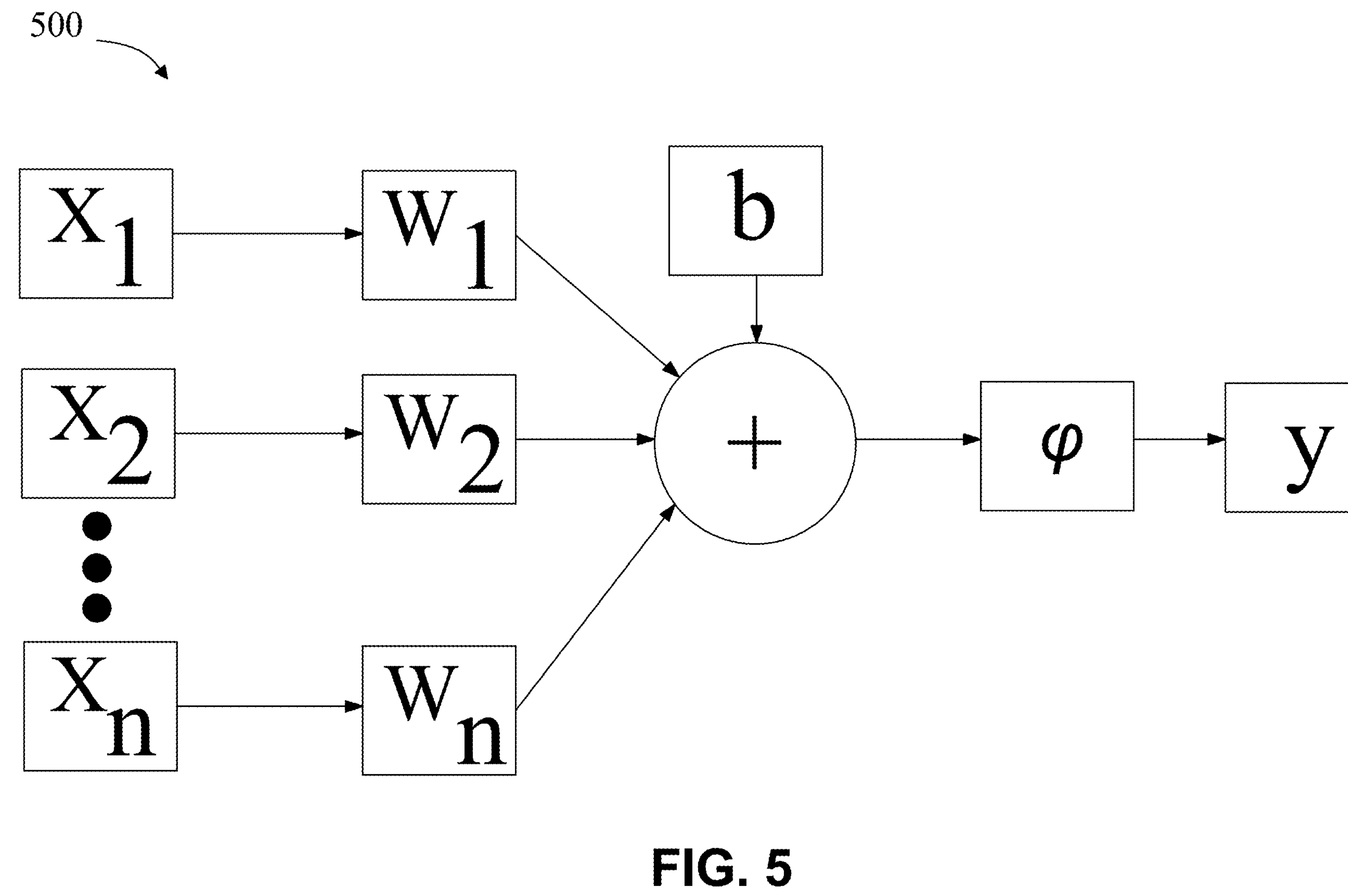
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ a(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} a(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
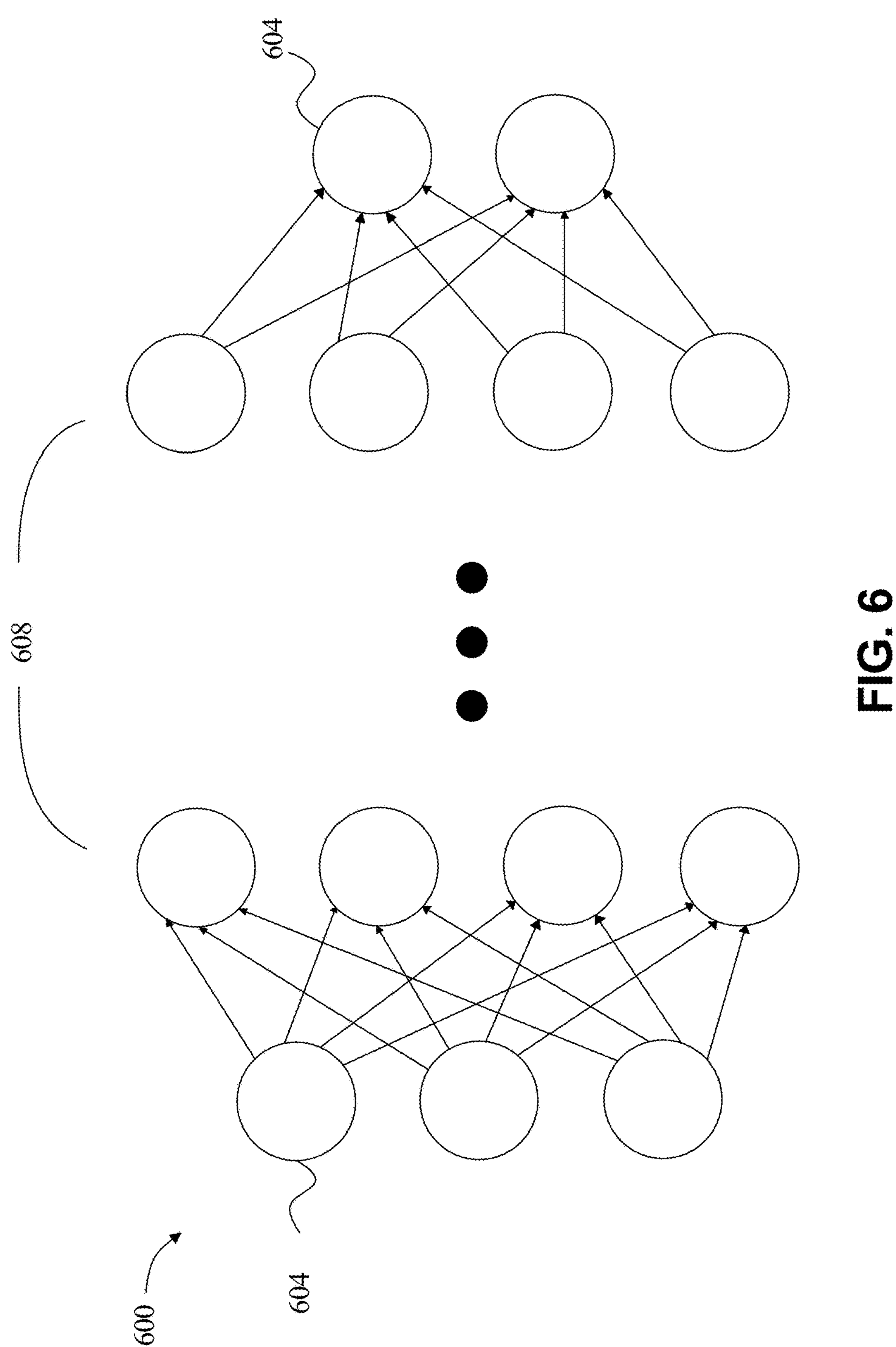
FIG. 6 is an exemplary illustration of a deep neural network.

Referring now to FIG. 6, an exemplary illustration 600 of a deep neural network. In an embodiment, the machine-learning model may comprise a deep neural network (DNN). As used in this disclosure, a "deep neural network" is defined as a neural network with two or more hidden layers. Neural network is described in further detail below with reference to FIGS. 1-5. In a non-limiting example, the machine-learning model may include a convolutional neural network (CNN). Generating using the machine learning process may include training CNN using labeled patient account data, demographic information, payment history, and insurance claim records training data and identifying a prediction associated with payment likelihood, patient engagement category, or account confidence value as a function of extracted spatial and semantic features using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., patient demographic data, chatbot response text, claim image data, or payment event data through a sliding window approach. In some cases, convolution operations may enable processor to detect local/global patterns, edges, textures, and any other features described herein within the multimodal input data received from patient or administrative interfaces. Spatial features may be passed through one or more activation functions, such as without limitation, Rectified Linear Unit (ReLU), to introduce non-linearities into the processing step of predictive inference and feature mapping. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the spatial dimensions of spatial feature maps by applying downsampling, such as max-pooling or average pooling, to small, non-overlapping regions of one or more features.

Still referring to FIG. 6, CNN may further include one or more fully connected layers 608 configured to combine features extracted by the convolutional and pooling layers as described above. In some cases, one or more fully connected layers 608 may allow for higher-level pattern recognition. In a non-limiting example, one or more fully connected layers 608 may connect every neuron (i.e., node 604) in its input to every neuron in its output, functioning as a traditional feedforward neural network layer. In some cases, one or more fully connected layers 608 may be used at the end of CNN to perform high-level reasoning and produce the final output such as, without limitation, a predicted payment likelihood score, a patient engagement classification, or an updated confidence indicator associated with a subject profile. Further, each fully connected layer 608 may be followed by one or more dropout layers configured to prevent overfitting, and one or more normalization layers to stabilize the learning process described herein.

With continued reference to FIG. 6, in an embodiment, training the machine-learning model (i.e., CNN) may include selecting a suitable loss function to guide the training process. In a non-limiting example, a loss function that measures the difference between the predicted payment likelihood score, engagement classification, or confidence indicator and the ground truth 3D structure e.g., verified payment outcomes, confirmed patient responses, or validated claim resolutions in the training data may be used, such as, without limitation, mean squared error (MSE) or a custom loss function may be designed for one or more embodiments described herein. Additionally, or alternatively, optimization algorithms, such as stochastic gradient descent (SGD), may then be used to adjust the machine-learning model's parameters to minimize such loss. In a further non-limiting embodiment, instead of directly predicting the categorical outcome or confidence score, the machine-learning model may be trained as a regression model to predict a continuous numeric value representing payment probability or engagement likelihood. Additionally, CNN may be extended with additional deep learning techniques, such as recurrent neural networks (RNNs) or attention mechanism, to capture additional features and/or data relationships within input data. These extensions may further enhance the accuracy and robustness of the predictive modeling process described herein.

Figure 7:
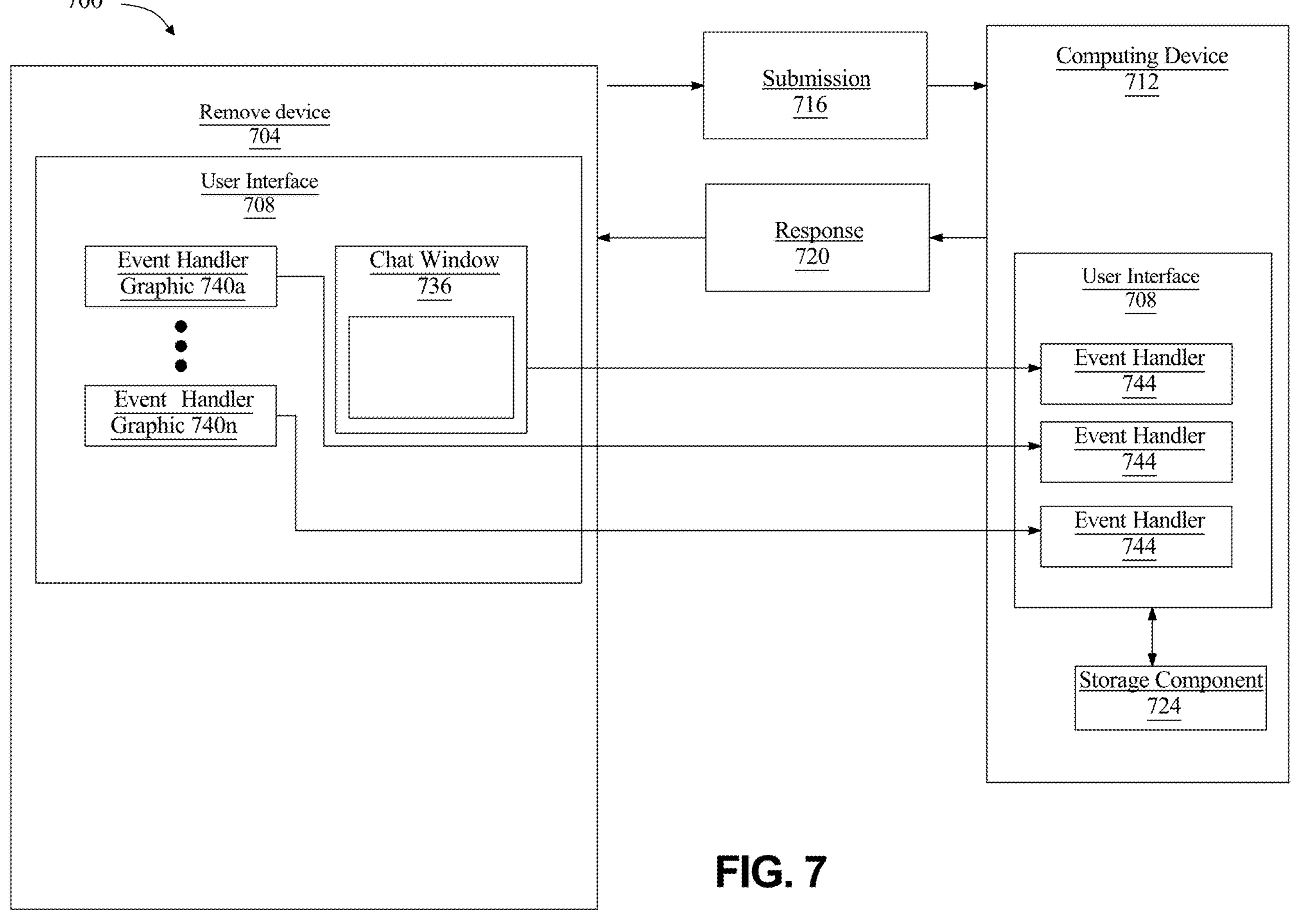
FIG. 7 is a diagram of an exemplary embodiment of a chatbot.

Referring now to FIG. 7, a user interface system 700 is schematically illustrated. User interface system 700 may configure a computing device 712 to configure a remote device 704 to perform display, input, and output functions, without limitation of a user interface. According to some embodiments, a user interface 708 may be communicative with a computing device 712, such as computing device as described above, that is configured to operate a chatbot. In some cases, user interface 708 may be local to computing device 712. Alternatively or additionally, in some cases, user interface 708 may remote to computing device 712 and communicative with the computing device 712, by way of one or more networks, such as without limitation the internet. Alternatively or additionally, user interface 708 may communicate with user device using telephonic devices and networks, such as without limitation fax machines, short message service (SMS), or multimedia message service (MMS). Commonly, user interface 708 communicates with computing device 712 using text-based communication, for example without limitation using a character encoding protocol, such as American Standard for Information Interchange (ASCII). Textual communication may be made between two or more users operating user devices, each of which may be configured by computing device to implement user interface. Two or more users may communicate with one another via user interface instances; alternatively or additionally, user interface 708 may conversationally interface using a chatbot, by way of at least a submission 716, from the user interface 708 to the chatbot, and a response 720, from the chatbot to the user interface 708. In many cases, one or both of submission 716 and response 720 are text-based communication. Alternatively or additionally, in some cases, one or both of submission 716 and response 720 are audio-based communication.

Continuing in reference to FIG. 7, a submission 716 once received by computing device 712 operating a chatbot, may be processed by circuitry and/or a processor, for instance and without limitation as described above. In some embodiments, processor processes a submission 716 using one or more of keyword recognition, pattern matching, and natural language processing. In some embodiments, processor employs real-time learning with evolutionary algorithms. In some cases, processor may retrieve a pre-prepared response from at least a storage component 724, based upon submission 716. Alternatively or additionally, in some embodiments, processor communicates a response 720 without first receiving a submission 716, thereby initiating conversation. Alternatively or additionally, processor may input user-submitted or other text as an input and may output a textual response using one or more generative artificial intelligence processes and/or components, such as without limitation an LLM or other generative model as described above. In some cases, processor communicates an inquiry to user interface 708; and the processor is configured to process an answer to the inquiry in a following submission 716 from the user interface 708. In some cases, an answer to an inquiry present within a submission 716 from a user device may be used by computing device 712 as an input to another function; inputs may include without limitation, composition data, pecuniary goal data, data suitable for use as survey data, or the like. Inputs generated by a chatbot may be input, without limitation, to any process, module, component, or other element described in this disclosure that can accept an input.

Still referring to FIG. 7, apparatus may, for instance, use a client-side program to configure a user device to display data and/or to perform event handling of user inputs; such display may be implemented, without limitation, as a graphical user interface. For instance, and without limitation, apparatus may display any output of any authentication process, any output of computation of predicted message, any output of any process used in computation of predicted message, any output of any authorization process, and/or any output of processes used to perform authorization. Apparatus and/or circuitry may configure a user device to display one or more event handler graphics 740*a-n*. As used in this disclosure, an "event handler graphic" is a graphical element with which a user of remote device may interact to enter data, for instance and without limitation for a search query or the like as described in further detail below. An event handler graphic 740*a-n* may include, without limitation, a button, a link, a checkbox, a text entry box and/or window, a drop-down list, a slider, or any other event handler graphic 740*a-n* that may occur to a person skilled in the art upon reviewing the entirety of this disclosure. An "event handler," as used in this disclosure, is a module, data structure, function, and/or routine that performs an action on remote device in response to a user interaction with event handler graphic 740*a-n*. For instance, and without limitation, an event handler 744 may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler 744 may generate prompts for further information, may compare data to validation rules such as requirements that the data in question be entered within certain numerical ranges, and/or may modify data and/or generate warnings to a user in response to such requirements. Event handler 744 may convert data into expected and/or desired formats, for instance such as date formats, currency entry formats, name formats, or the like. Event handler 744 may transmit data from remote device to apparatus and/or circuitry.

In an embodiment, and further referring to FIG. 1, event handler 744 may include a cross-session state variable. As used in this disclosure, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on apparatus and/or circuitry; for instance, data may be saved wholly or in part as a "cookie" which may include data or an identification of remote device to prompt provision of cross-session state variable by apparatus and/or circuitry, which may store the data on apparatus and/or circuitry. Alternatively, or additionally, apparatus and/or circuitry may use login credentials, device identifier, and/or device fingerprint data to retrieve cross-session state variable, which apparatus and/or circuitry may transmit to remote device. Cross-session state variable may include at least a prior session datum. A "prior session datum" may include any element of data that may be stored in a cross-session state variable. Event handler graphic 740*a-n* may be further configured to display the at least a prior session datum, for instance and without limitation auto-populating user query data from previous sessions.

With continued reference to FIG. 7, in one or more embodiments, users may utilize instances of user interface system 700 to exchange text messages with each other. User interface 708 may include functionality to configure each or any remote device to display a chat window 736. A chat window 736 may include a window or field that displays text generated by one or more users and/or chatbot outputs, and/or a window or field for entry of textual data by a user; windows and/or fields for display and entry may be separate. An event handler graphic 740*a-n* and/or event handler 744 may transmit textual entries and/or display such entries, for instance and without limitation when a user "posts" such entries to make them visible to a chatbot and/or another user.

Figure 8:
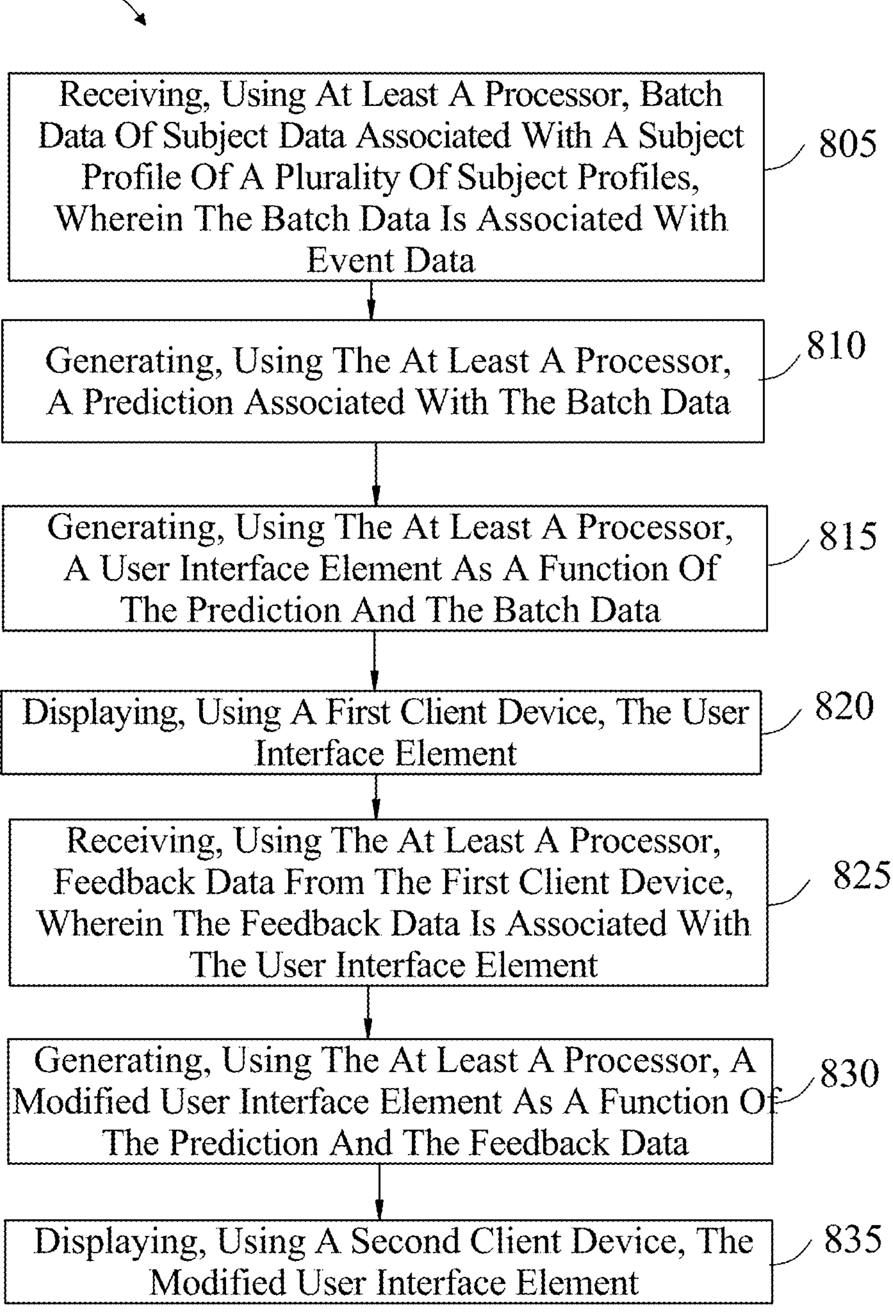
FIG. 8 is a block diagram of an exemplary method of displaying a modified user interface element.

Referring now to FIG. 8, a flow diagram of an exemplary method 800 for displaying a modified user interface element is illustrated. At step 805, method 800 includes receiving, using at least a processor, batch data of subject data associated with a subject profile of a plurality of subject profiles, wherein the batch data is associated with event data. This may be implemented as described and with reference to FIGS. 1-7.

Still referring to FIG. 8, at step 810, method 800 includes generating, using the at least a processor, a prediction associated with the batch data. This may be implemented as described and with reference to FIGS. 1-7.

Still referring to FIG. 8, at step 815, method 800 includes generating, using the at least a processor, a user interface element as a function of the prediction and the batch data. This may be implemented as described and with reference to FIGS. 1-7.

Still referring to FIG. 8, at step 820, method 800 includes displaying, using a first client device, the user interface element. This may be implemented as described and with reference to FIGS. 1-7.

Still referring to FIG. 8, at step 825, method 800 includes receiving, using the at least a processor, feedback data from the first client device, wherein the feedback data is associated with the user interface element. This may be implemented as described and with reference to FIGS. 1-7.

Still referring to FIG. 8, at step 830, method 800 includes generating, using the at least a processor, a modified user interface element as a function of the prediction and the feedback data. This may be implemented as described and with reference to FIGS. 1-7

Still referring to FIG. 8, at step 835, method 800 includes displaying, using a second client device, the modified user interface element. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, As used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
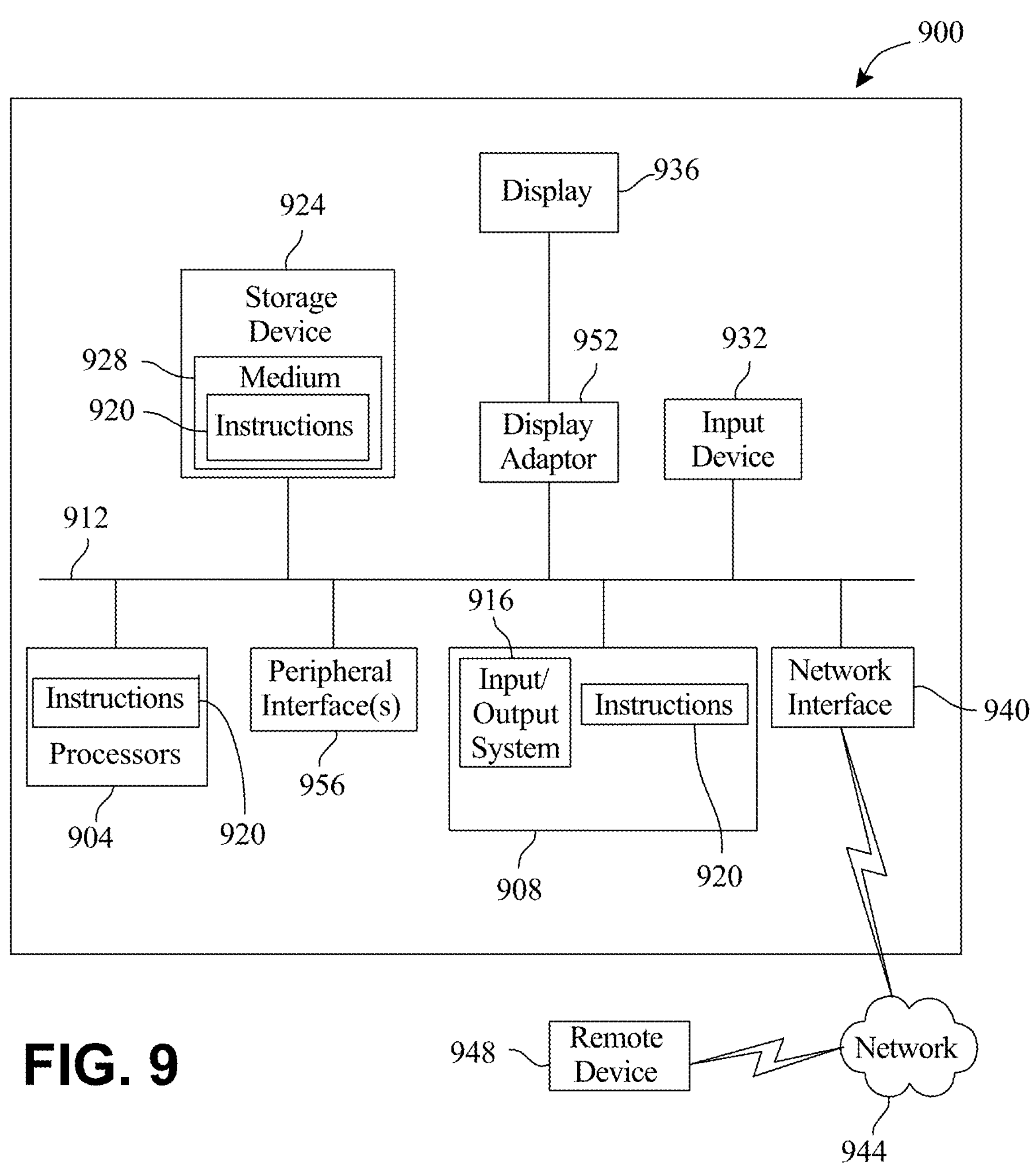
FIG. 9 is a block diagram of a computing system that can be used to implement any one or more of the methodologies disclosed herein and any one or more portions thereof.

FIG. 9 shows a diagrammatic representation of one embodiment of computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for displaying a modified user interface element, wherein the apparatus comprises: at least a computing device, wherein the at least a computing device comprises: a memory; and at least a processor communicatively connected to the memory, wherein the memory contains instructions configuring the at least a processor to: receive batch data of subject data associated with a subject profile of a plurality of subject profiles, wherein the batch data is associated with event data; generate a prediction associated with the batch data; generate a user interface element as a function of the prediction and the batch data; display, using a first client device, the user interface element; receive feedback data from the first client device, wherein the feedback data is associated with the user interface element; generate a modified user interface element as a function of the prediction and the feedback data; and display, using a second client device, the modified user interface element, wherein the prediction comprises one or more of interpolation data and an adjustment value, wherein the adjustment value is generated as a function of the batch data, wherein the at least a processor is further configured to: display the modified user interface element on a plurality of client devices; and synchronize visual changes between the client devices in real time responsive to the feedback data.

2. The apparatus of claim 1, wherein the user interface element comprises a chatbot field.

3. The apparatus of claim 2, wherein the at least a processor is further configured to: receive, using a natural language processor, text data input into the chatbot field; and encode the text data by segmenting the text data into linguistic units and generating a vector representation of the segmented text as a function of a contextual embedding model.

4. The apparatus of claim 1, wherein the at least a processor is further configured to: generate a plurality of user interface elements arranged in a sequence, each user interface element generated in response to a prior user input; and display the plurality of user interface elements as an iterative series of prompts.

5. The apparatus of claim 1, wherein the at least a processor is further configured to generate a display structure of the user interface element as a function of the prediction and a subject category associated with the subject profile.

6. The apparatus of claim 1, wherein the at least a processor is further configured to: generate, as a function of the prediction, a visual layout comprising one or more dynamic graphical user interface components.

7. The apparatus of claim 1, wherein the at least a processor is further configured to: generate, within the user interface element, an adaptive display region configured to render input modes including one or more of a selectable menu and a graphical control.

8. The apparatus of claim 1, wherein the at least a processor is further configured to: modify a visual presentation of the user interface element by adjusting at least a color scheme and animation sequence as a function of the prediction and the received feedback data.

9. A method of displaying a modified user interface element, wherein the method comprises: receiving, using at least a processor, batch data of subject data associated with a subject profile of a plurality of subject profiles, wherein the batch data is associated with event data; generating, using the at least a processor, a prediction associated with the batch data; generating, using the at least a processor, a user interface element as a function of the prediction and the batch data; displaying, using a first client device, the user interface element; receiving, using the at least a processor, feedback data from the first client device, wherein the feedback data is associated with the user interface element; generating, using the at least a processor, a modified user interface element as a function of the prediction and the feedback data; and displaying, using a second client device, the modified user interface element, wherein the prediction comprises one or more of interpolation data and an adjustment value, wherein the adjustment value is generated as a function of the batch data, wherein the at least a processor is further configured to: display the modified user interface element on a plurality of client devices; and synchronize visual changes between the client devices in real time responsive to the feedback data.

10. The method of claim 9, wherein the user interface element comprises a chatbot field.

11. The method of claim 10, further comprising: receiving, using a natural language processor, text data input into the chatbot field; and encoding, using the at least a processor, the text data by segmenting the text data into linguistic units and generating a vector representation of the segmented text as a function of a contextual embedding model.

12. The method of claim 9, further comprising: generating, using the at least a processor, a plurality of user interface elements arranged in a sequence, each user interface element generated in response to a prior user input; and displaying, using the at least a processor, the plurality of user interface elements as an iterative series of prompts.

13. The method of claim 9, further comprising generating, using the at least a processor, a display structure of the user interface element as a function of the prediction and a subject category associated with the subject profile.

14. The method of claim 9, further comprising: generating, using the at least a processor as a function of the prediction, a visual layout comprising one or more dynamic graphical user interface components.

15. The method of claim 9, further comprising: generating, using the at least a processor within the user interface element, an adaptive display region configured to render input modes including one or more of a selectable menu and a graphical control.

16. The method of claim 9, further comprising: modifying, using the at least a processor, a visual presentation of the user interface element by adjusting at least a color scheme and animation sequence as a function of the prediction and the received feedback data.

* * * * *